US012713326B2

(12) United States Patent
Fujishiro et al.

(10) Patent No.: US 12,713,326 B2

(45) Date of Patent: Aug. 18, 2026

(54) COMMUNICATION CONTROL METHOD

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

(*) Notice: Subject to any disclaimer, the term of this patent is extended or adjusted under 35 U.S.C. 154(b) by 404 days.

(21) Appl. No.: 18/303,808

(22) Filed: Apr. 20, 2023

(65) Prior Publication Data

US 2023/0328629 A1 Oct. 12, 2023

Related U.S. Application Data

(63) Continuation of application No. PCT/JP2021/038658, filed on Oct. 19, 2021.

(60) Provisional application No. 63/094,428, filed on Oct. 21, 2020.

(51) Int. Cl.

*H04W 40/34* (2009.01)
*H04L 45/00* (2022.01)
*H04L 45/28* (2022.01)
*H04W 24/04* (2009.01)

(52) U.S. Cl.

CPC ............ *H04W 40/34* (2013.01); *H04L 45/22* (2013.01); *H04L 45/28* (2013.01); *H04W 24/04* (2013.01)

(58) Field of Classification Search

CPC ..... H04W 40/34; H04W 88/04; H04W 24/04; H04W 36/00837; H04W 36/362; H04L 45/22; H04L 45/28

See application file for complete search history.

(56) References Cited

U.S. PATENT DOCUMENTS 7,876,672 B2 * 1/2011 Chao ........................ H04L 45/28 370/221
11,843,968 B2 * 12/2023 Lee ........................ H04W 40/34
2007/0195713 A1 * 8/2007 Khan ........................ H04L 45/20 370/254
2016/0014019 A1 * 1/2016 Ibuki ........................ H04L 45/28 370/216
2017/0006499 A1 * 1/2017 Hampel .............. H04L 41/0668

(Continued)

FOREIGN PATENT DOCUMENTS

WO 2019/242683 A1 12/2019
WO 2020/067517 A1 4/2020

(Continued)

OTHER PUBLICATIONS

ZTE, "Consideration on Routing Design for IAB", 3GPP TSG-RAN WG3 Meeting #100, R3-182795, Busan3 Korea.3 May 21-25, 2018, Total Pages: 4 (Year: 2018).*

(Continued)

*Primary Examiner* — Shah M Rahman

(74) *Attorney, Agent, or Firm* — Studebaker Brackett PLLC

(57) ABSTRACT

A communication control method according to a first aspect is a communication control method used in a cellular communication system. The communication control method includes transmitting, by a relay node that detects occurrence of a failure in a backhaul link between the relay node and a parent node of the relay node, a notification instructing execution of a conditional handover, and receiving, by a communication apparatus, the notification.

4 Claims, 19 Drawing Sheets

(56) References Cited

U.S. PATENT DOCUMENTS

2020/0221367 A1* 7/2020 Hashemi ............... H04W 40/12
2021/0105795 A1 4/2021 Zhu et al.
2021/0119905 A1* 4/2021 Kuenzi ................... H04L 45/28
2021/0194796 A1* 6/2021 Shariat .................... H04L 45/22
2021/0258244 A1* 8/2021 Xu .......................... H04L 45/28
2021/0274425 A1* 9/2021 Shih ........................ H04L 41/12
2021/0321315 A1* 10/2021 Yi ......................... H04W 76/18
2021/0377757 A1* 12/2021 Liu ....................... H04L 1/1896
2021/0378041 A1* 12/2021 Narasimha ............ H04W 76/19
2022/0014987 A1 1/2022 Fujishiro
2022/0015000 A1 1/2022 Fujishiro et al.
2022/0015011 A1* 1/2022 Liu ....................... H04W 76/15
2023/0075709 A1* 3/2023 Shariat .............. H04W 28/0967
2023/0164620 A1* 5/2023 Lee ....................... H04W 40/34
2023/0164658 A1* 5/2023 Ishii .................. H04W 36/0055
370/331

FOREIGN PATENT DOCUMENTS

WO 2020/167036 A1 8/2020
WO 2020/196124 A1 10/2020
WO 2020/196201 A1 10/2020

OTHER PUBLICATIONS

3rd Generation Partnership Project; Technical Specification Group Radio Access Network; NR; NR and NG-RAN Overall Description; Stage 2 (Release 16); 3GPP TS 38.300 V16.2.0 (Jul. 2020), total 6 pages, Jul. 2020.

* cited by examiner

- Type 1 – "Plain" notification: Indication that BH link RLF is detected by the child IAB-node.
- Type 2 – "Trying to recover": Indication that BH link RLF is detected, and the child IAB-node is attempting to recover from it.
- Type 3 – "BH link recovered": Indication that the BH link successfully recovers from RLF.
- Type 4 – "Recovery failure": Indication that the BH link RLF recovery failure occurs.
- Type 4x – "Indicating child nodes to perform RLF procedure": it is implementation when the parent sending this indication, and the child node should perform RLF related procedure when receiving this indication.

FIG. 16

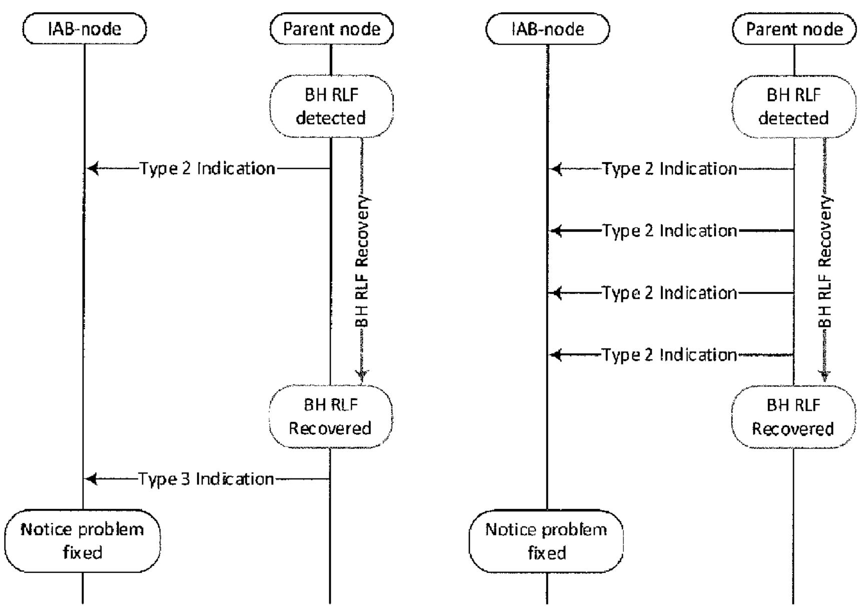

FIG. 17

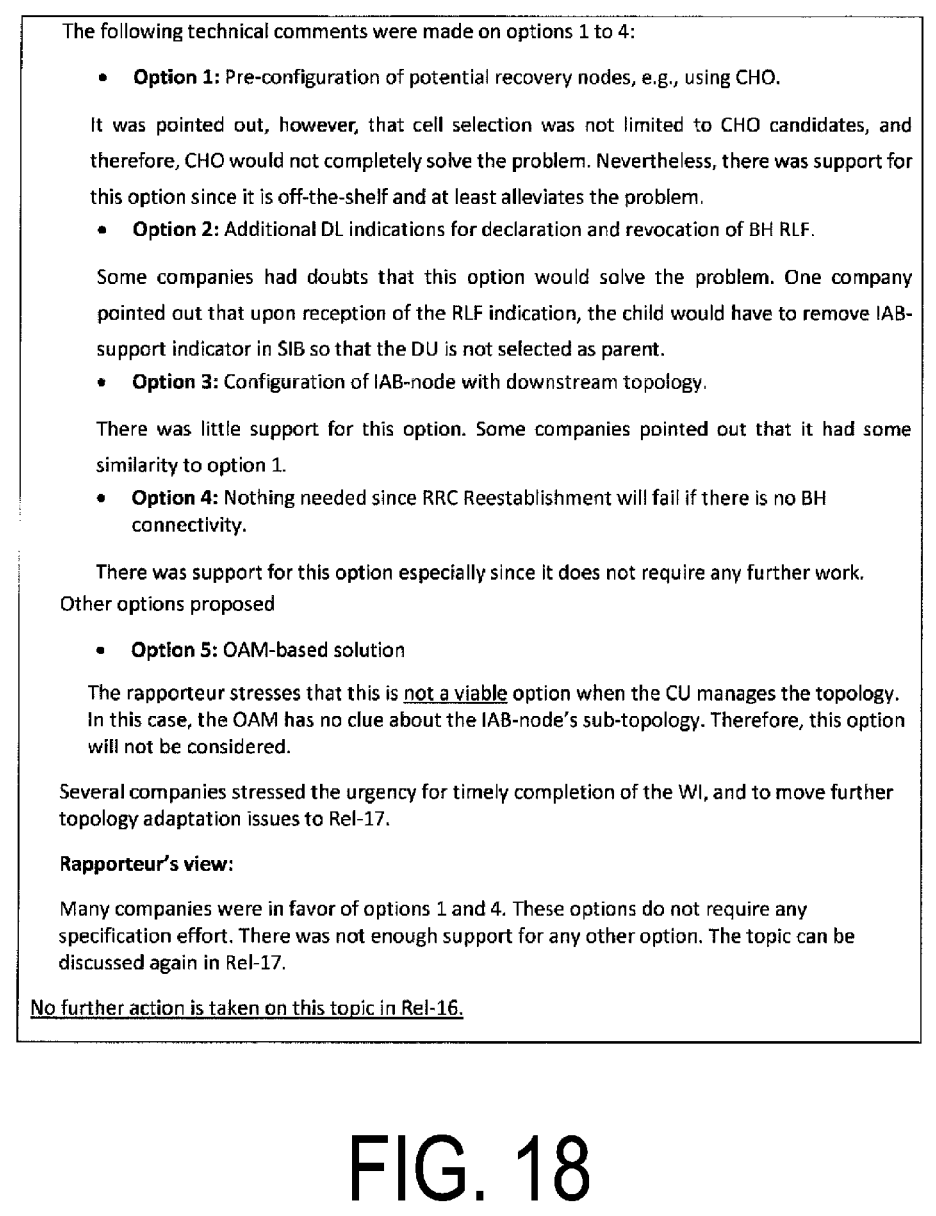

The following technical comments were made on options 1 to 4:

- Option 1: Pre-configuration of potential recovery nodes, e.g., using CHO.

It was pointed out, however, that cell selection was not limited to CHO candidates, and therefore, CHO would not completely solve the problem. Nevertheless, there was support for this option since it is off-the-shelf and at least alleviates the problem.

- Option 2: Additional DL indications for declaration and revocation of BH RLF.

Some companies had doubts that this option would solve the problem. One company pointed out that upon reception of the RLF indication, the child would have to remove IAB-support indicator in SIB so that the DU is not selected as parent.

- Option 3: Configuration of IAB-node with downstream topology.

There was little support for this option. Some companies pointed out that it had some similarity to option 1.

- Option 4: Nothing needed since RRC Reestablishment will fail if there is no BH connectivity.

There was support for this option especially since it does not require any further work.

Other options proposed

- Option 5: OAM-based solution

The rapporteur stresses that this is <u>not a viable</u> option when the CU manages the topology. In this case, the OAM has no clue about the IAB-node's sub-topology. Therefore, this option will not be considered.

Several companies stressed the urgency for timely completion of the WI, and to move further topology adaptation issues to Rel-17.

Rapporteur's view:

Many companies were in favor of options 1 and 4. These options do not require any specification effort. There was not enough support for any other option. The topic can be discussed again in Rel-17.

<u>No further action is taken on this topic in Rel-16.</u>

FIG. 18

| | Modification of PDCP protocol/procedures | Rerouting of PDCP PDUs buffered on intermediate IAB-nodes | Introducing UL status delivery |
|---|---|---|---|
| **Applicable to Rel-15 UEs** | **No** | **Yes** | **Yes** |
| **Signaling overhead** | **Yes**<br>New signaling for triggering data retransmission | **Yes**<br>New signaling for either deciding whether to discard the buffered data or configuring the forwarding path for the buffered data on the old route. | **Yes**<br>New signaling for confirming data reception and/or triggering data retransmission. |
| **Support of lossless delivery of UL data** | **Yes** | **No** | **Yes** |

FIG. 19

| Solution | Descriptions |
|---|---|
| C-1 | Access IAB node delays the sending of RLC ACKs to UE until a confirmation of reception at IAB donor [3, 4, 7].<br><br>When PDCP data recovery / PDCP re-establishment is triggered by RRC, UE retransmits all the PDCP SDUs for which the successful delivery has not been confirmed by lower layers as in the current PDCP specification.<br><br>C-1 would need UL status report from IAB donor to access IAB node. This could be UE bearer specific due to its end to end nature. |
| C-2 | Access IAB node delays the sending of RLC ACKs to UE until a confirmation of reception at its parent node, and the parent node should also delay the sending of RLC ACKs to its child node until a confirmation of reception at its parent node, and so on [4].<br><br>When PDCP data recovery / PDCP re-establishment is triggered by RRC, UE retransmits all the PDCP SDUs for which the successful delivery has not been confirmed by lower layers as in the current PDCP specification.<br><br>C-2 would need some enhancements towards RLC ACK/NACK operation between IAB nodes, e.g. with hop by hop RLC ARQ, BH RLC channels multiplex data from many UEs, potentially being served by different downstream IAB nodes. This may lead to stalling RLC ACKs for some UEs based on data being not confirmed for other UEs. |

FIG. 20

COMMUNICATION CONTROL METHOD

RELATED APPLICATIONS

The present application is a continuation based on PCT Application No. PCT/JP2021/038658, filed on Oct. 19, 2021, which claims the benefit of U.S. Provisional Application No. 63/094,428 filed on Oct. 21, 2020. The content of which is incorporated by reference herein in their entirety.

TECHNICAL FIELD

The present invention relates to a communication control method used in a cellular communication system.

BACKGROUND OF INVENTION

In the Third Generation Partnership Project (3GPP), which is a standardization project of a cellular communication system, introduction of a new relay node referred to as an Integrated Access and Backhaul (IAB) node is under study (for example, see "3GPP TS 38.300 V16.2.0 (2020-07)"). One or more relay nodes are involved in communication between a base station and a user equipment, and perform relay for the communication.

SUMMARY

A communication control method according to a first aspect is a communication control method used in a cellular communication system. The communication control method includes transmitting, by a relay node that has detected occurrence of a failure in a backhaul link between the relay node and a parent node of the relay node, a notification instructing execution of a conditional handover, and receiving, by a communication apparatus, the notification.

A communication control method according to a second aspect is a communication control method used in a cellular communication system. The communication control method includes, by a first relay node that has detected occurrence of a failure in a backhaul link between the first relay node and a parent node of the first relay node, including, in a failure occurrence notification indicating the occurrence of the failure, forwarding availability information indicating whether to forward the failure occurrence notification and then transmitting the failure occurrence notification to a second relay node. The communication control method further includes, by the second relay node and, in accordance with the forwarding availability information, forwarding the failure occurrence notification received from the first relay node or not forwarding the failure occurrence notification received from the first relay node.

A communication control method according to a third aspect is a communication control method used in a cellular communication system. The communication control method includes transmitting, by a first relay node, a first request, which requests a change in a route priority, to a second relay node in transmitting a failure occurrence notification indicating occurrence of a failure in a backhaul link or a recovery failure notification indicating a failure in recovery from the failure in the backhaul link. The communication control method includes changing, by the second relay node and in response to reception of the first request, a priority of a first route from the second relay node to a fourth relay node via a third relay node and/or a priority of a second route from the second relay node to the fourth relay node via a fifth relay node. The communication control method further includes transmitting, by the second relay node, a packet in accordance with the priority of the first route having changed and/or the priority of the second route having changed.

A communication control method according to a fourth aspect is a communication control method used in a cellular communication system. The communication control method includes receiving, by a second relay node and from a first relay node, a failure occurrence notification indicating occurrence of a failure in a backhaul link, and, by the second relay node and in response to reception of the failure occurrence notification, deactivating a configuration of a main path and activating a configuration of an alternative path for the main path.

BRIEF DESCRIPTION OF THE DRAWINGS

FIG. 16 is a diagram illustrating types of BH RLF notifications.

FIG. 17 illustrates transmission options for an enhanced BH RLF indication.

FIG. 18 is a diagram illustrating identified solutions for avoiding reestablishment to a descendant node.

FIG. 19 is a diagram illustrating a comparison of mechanisms for lossless delivery of UL data in a case of hop-by-hop RLCARQ.

FIG. 20 is a diagram illustrating options of "C) introduction of UL status delivery".

DESCRIPTION OF EMBODIMENTS

A cellular communication system according to an embodiment will be described with reference to the drawings. In the description of the drawings, the same or similar parts are denoted by the same or similar reference signs.

Configuration of Cellular Communication System A configuration example of a cellular communication system according to an embodiment will be described. A cellular communication system 1 according to an embodiment is a 3GPP 5G system. Specifically, a radio access scheme in the cellular communication system 1 is New Radio (NR) being a radio access scheme of the 5G. Note that Long Term Evolution (LTE) may be at least partially applied to the cellular communication system 1. A future cellular communication system such as 6G may be applied as the cellular communication system 1.

Figure 1:
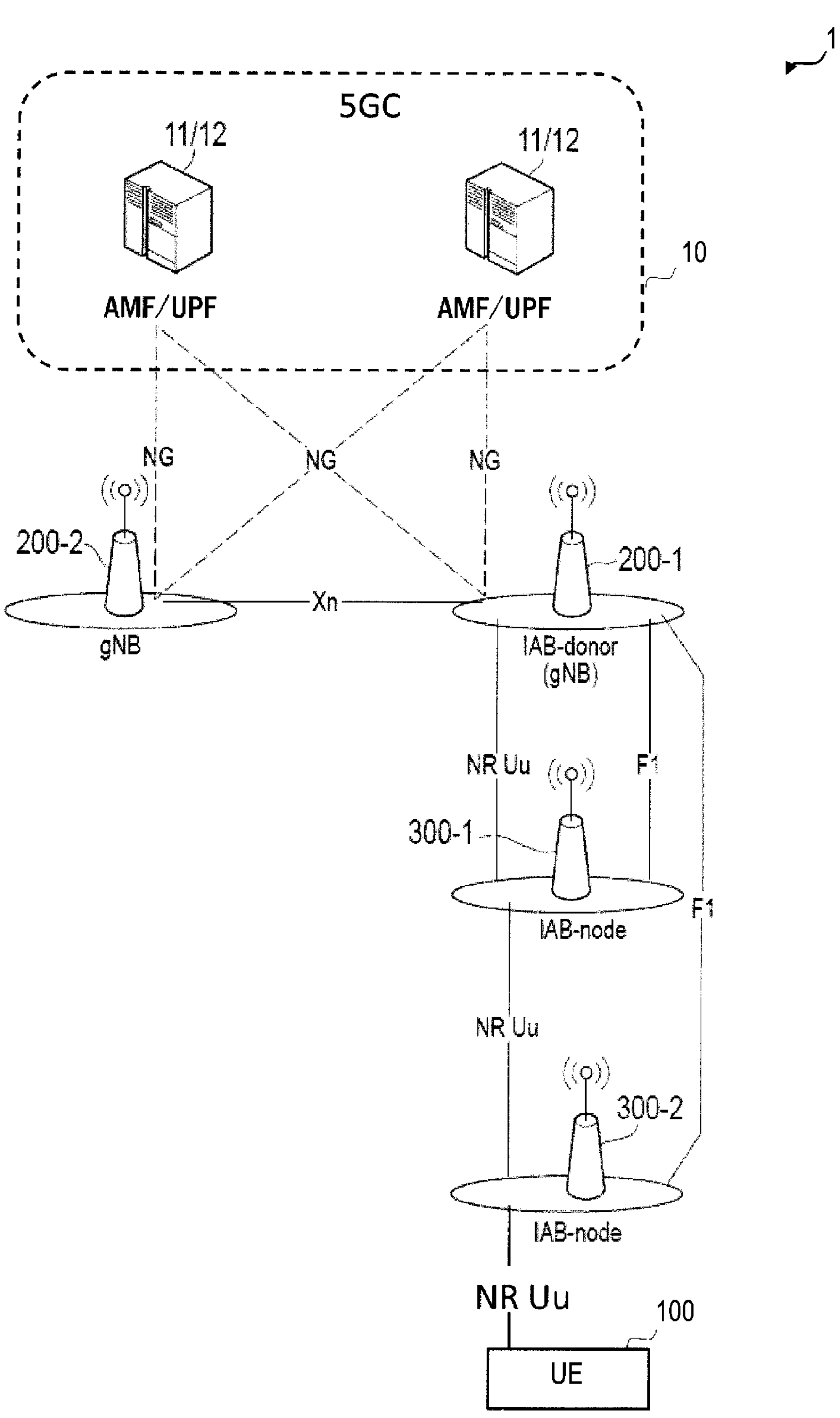
FIG. 1 is a diagram illustrating a configuration example of a cellular communication system according to an embodiment.

FIG. 1 is a diagram illustrating a configuration example of a cellular communication system 1 according to an embodiment.

As illustrated in FIG. 1, the cellular communication system 1 includes a 5G core network (5GC) 10, a User Equipment (UE) 100, base station apparatuses (hereinafter, may be referred to as "base stations") 200-1 and 200-2, and IAB nodes 300-1 and 300-2. Each base station 200 may be referred to as a gNB.

The following description focuses on an example in which each base station 200 is an NR base station; however, the base station 200 may be an LTE base station (i.e., an eNB).

Note that, in the following description, the base stations 200-1 and 200-2 may be referred to as the gNB 200 (or the base station 200), and the IAB nodes 300-1 and 300-2 may be referred to as the IAB node 300.

The 5GC 10 includes an Access and Mobility Management Function (AMF) 11 and a User Plane Function (UPF) 12. The AMF 11 is an apparatus that performs various types of mobility controls and the like for the UE 100. The AMF 11 communicates with the UE 100 by using Non-Access Stratum (NAS) signaling, and thereby manages information of an area in which the UE 100 exists. The UPF 12 is an apparatus that performs transfer control of user data and the like.

Each gNB 200 is a fixed wireless communication node and manages one or more cells. The term "cell" is used to indicate a minimum unit of a wireless communication area. The term "cell" may be used to indicate a function or a resource for performing wireless communication with the UE 100. One cell belongs to one carrier frequency. Hereinafter, the cell and the base station may be used without being distinguished from each other.

Each gNB 200 is interconnected to the 5GC 10 via an interface referred to as an NG interface. FIG. 1 illustrates two gNBs, namely a gNB 200-1 and a gNB 200-2 that are connected to the 5GC 10.

Each gNB 200 may be divided into a Central Unit (CU) and a Distributed Unit (DU). The CU and the DU are interconnected via an interface referred to as an F1 interface. The F1 protocol is a communication protocol between the CU and the DU and includes an F1-C protocol corresponding to a protocol for a control plane and an F1-U protocol corresponding to a protocol for a user plane.

The cellular communication system 1 supports an IAB that uses NR for the backhaul to enable wireless relay of NR access. The donor gNB 200-1 is a donor base station corresponding to a terminal node of the NR backhaul on the network end and including additional functions that support the IAB. The backhaul can implement multi-hop via a plurality of hops (i.e., a plurality of IAB nodes 300).

FIG. 1 illustrates an example in which an IAB node 300-1 is wirelessly connected to the donor gNB 200-1, an IAB node 300-2 is wirelessly connected to the IAB node 300-1, and the F1 protocol is transmitted via two backhaul hops.

The UE 100 is a mobile wireless communication apparatus that performs wireless communication with cells. The UE 100 may be any type of apparatus as long as the UE 100 is an apparatus that performs wireless communication with the gNB 200 or the IAB node 300. For example, the UE 100 is a mobile phone terminal, a tablet terminal, a laptop PC, a sensor or an apparatus that is provided in the sensor, a vehicle or an apparatus that is provided in the vehicle, or a flight vehicle or an apparatus that is provided in the flight vehicle. The UE 100 is wirelessly connected to the IAB node 300 or the gNB 200 via an access link. FIG. 1 illustrates an example in which the UE 100 is wirelessly connected to the IAB node 300-2. The UE 100 indirectly communicates with the donor gNB 200-1 via the IAB node 300-2 and the IAB node 300-1.

Figure 2:
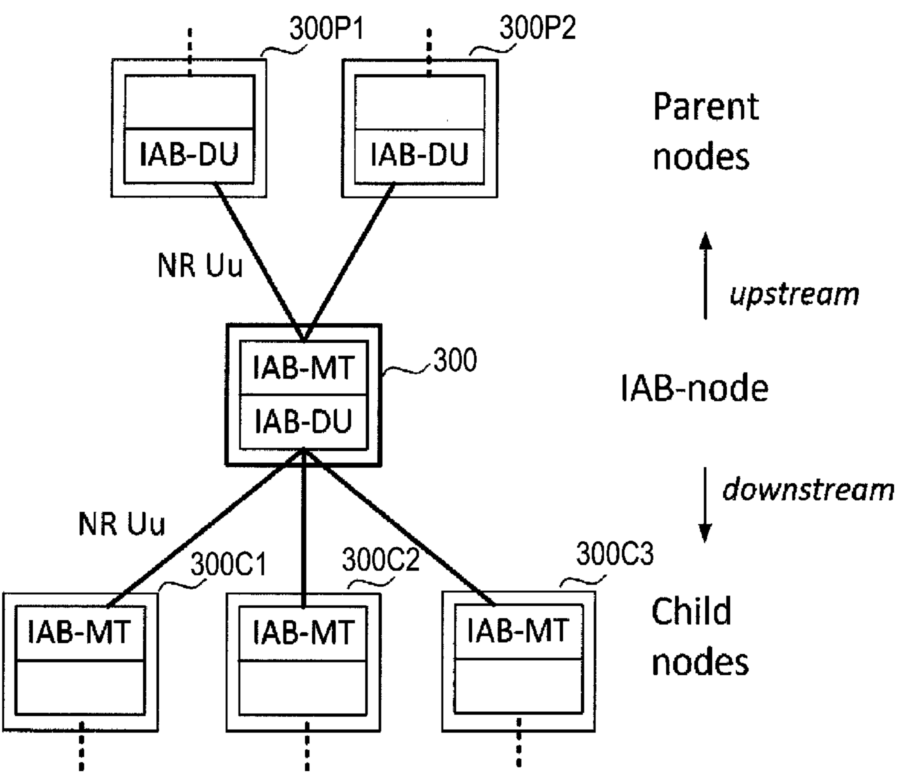
FIG. 2 is a diagram illustrating a relationship between an IAB node, Parent nodes, and Child nodes.

FIG. 2 is a diagram illustrating the relationship between the IAB node 300, the Parent nodes, and the Child nodes.

As illustrated in FIG. 2, each IAB node 300 includes an IAB-DU corresponding to a base station function unit and an IAB-Mobile Termination (MT) corresponding to a user equipment function unit.

Neighboring nodes on an NR Uu wireless interface of the IAB-MT (i.e., upper nodes) may be referred to as "parent nodes". The parent node is the DU of a parent IAB node or a donor gNB 200. A radio link between the IAB-MT and each parent node is referred to as a backhaul link (BH link). FIG. 2 illustrates an example in which the parent nodes of the IAB node 300 are IAB nodes 300P1 and 300P2. Note that the direction toward the parent nodes is referred to as upstream. Seen from the UE 100, upper nodes of the UE 100 can correspond to the parent nodes.

Neighboring nodes on an NR Uu access interface of the IAB-DU (i.e., lower nodes) are referred to as child nodes. The IAB-DU manages cells in a manner the same as, and/or similar to the gNB 200. The IAB-DU terminates the NR Uu wireless interface connected to the UE 100 and the lower IAB nodes. The IAB-DU supports the F1 protocol for the CU of the donor gNB 200-1. FIG. 2 illustrates an example in which the child nodes of the IAB node 300 are IAB nodes 300-C1 to 300-C3; however, the child nodes of the IAB node 300 may include the UE 100. Note that the direction toward the child nodes is referred to as downstream.

Configuration of Base Station

Figure 3:
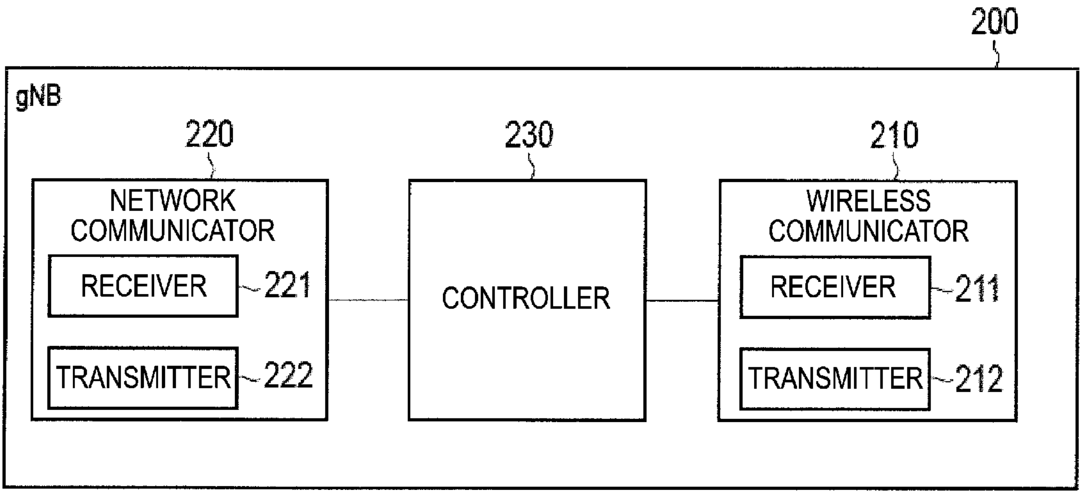
FIG. 3 is a diagram illustrating a configuration example of a base station (gNB) according to an embodiment.

In an embodiment, a configuration of the gNB 200 that is a base station will be described. FIG. 3 is a diagram illustrating a configuration example of the gNB 200. As illustrated in FIG. 3, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of reception under control of the controller 230. The receiver 211 includes an antenna, converts (down-converts) a radio signal received by the antenna into a baseband signal (reception signal), and outputs the baseband signal to the controller 230. The transmitter 212 performs various types of transmission under control of the controller 230. The transmitter 212 includes an antenna, converts (up-converts) a baseband signal (transmission signal) output by the controller 230 into a radio signal, and transmits the radio signal from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of reception under control of the controller 230. The receiver 221 receives a signal from the outside and outputs the reception signal to the controller 230. The transmitter 222 performs various types of transmission under control of the controller 230. The transmitter 222 transmits a transmission signal output by the controller 230 to the outside.

The controller 230 performs various types of controls for the gNB 200. The controller 230 includes at least one memory and at least one processor electrically connected to the memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing. The processor performs processing of the layers described below. The controller 230 may perform each processing operation in the gNB 200 in each embodiment described below.

Configuration of Relay Node

Figure 4:
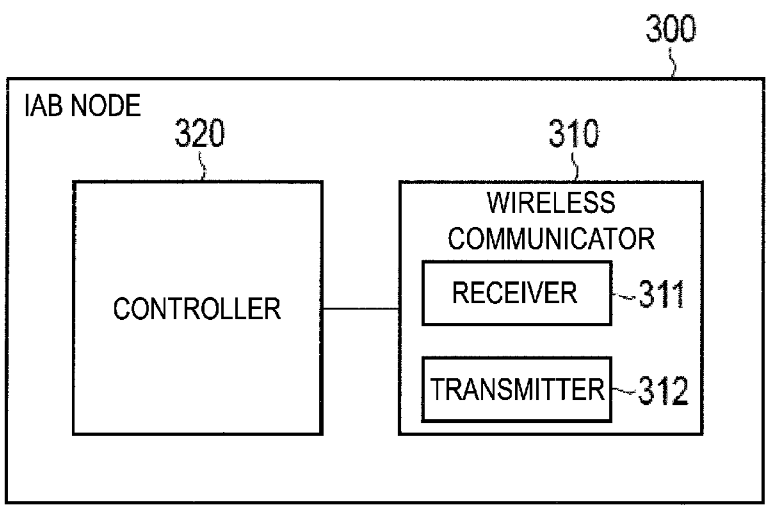
FIG. 4 is a diagram illustrating a configuration example of a relay node (IAB node) according to an embodiment.

A configuration of the IAB node 300 that is a relay node according to an embodiment (or a relay node apparatus. The relay node according to an embodiment may hereinafter be referred to as the "relay node") will be described. FIG. 4 is a diagram illustrating a configuration example of the IAB node 300. As illustrated in FIG. 4, the IAB node 300 includes a wireless communicator 310 and a controller 320. The IAB node 300 may include a plurality of wireless communicators 310.

The wireless communicator 310 performs wireless communication (BH link) with the gNB 200 and performs wireless communication (access link) with the UE 100. The wireless communicator 310 for the BH link communication and the wireless communicator 310 for the access link communication may be provided separately.

The wireless communicator 310 includes a receiver 311 and a transmitter 312. The receiver 311 performs various types of reception under control of the controller 320. The receiver 311 includes an antenna, converts (down-converts) a radio signal received by the antenna into a baseband signal (reception signal), and outputs the baseband signal to the controller 320. The transmitter 312 performs various types of transmission under control of the controller 320. The transmitter 312 includes an antenna, converts (up-converts) a baseband signal (transmission signal) output by the controller 320 into a radio signal, and transmits the radio signal from the antenna.

The controller 320 performs various types of controls in the IAB node 300. The controller 320 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. The controller 320 may perform each processing operation in the IAB node 300 in each embodiment described below.

Configuration of User Equipment

Figure 5:
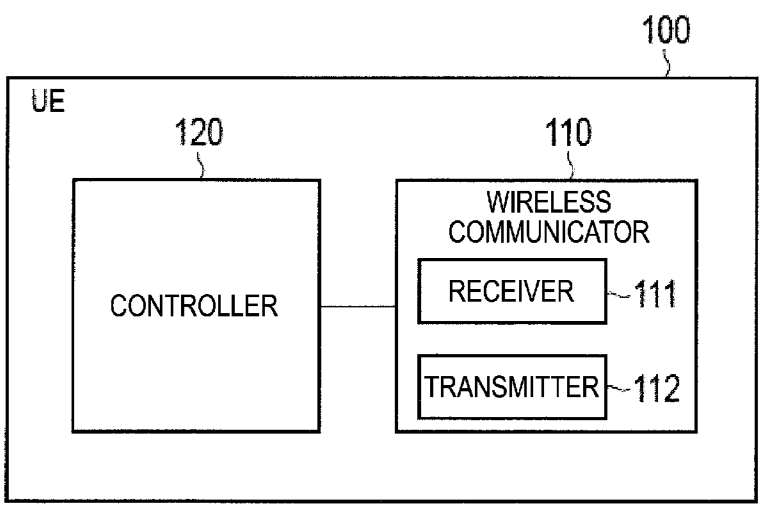
FIG. 5 is a diagram illustrating a configuration example of a user equipment (UE) according to an embodiment.

In an embodiment, a configuration of the UE 100 that is a user equipment will be described. FIG. 5 is a diagram illustrating a configuration of the UE 100. As illustrated in FIG. 5, the UE 100 includes a wireless communicator 110 and a controller 120.

The wireless communicator 110 performs wireless communication in the access link, specifically, wireless communication with the gNB 200 and wireless communication with the IAB node 300. The wireless communicator 110 may perform wireless communication in the sidelink, that is, wireless communication with another UE 100. The wireless communicator 110 includes a receiver 111 and a transmitter 112. The receiver 111 performs various types of reception under control of the controller 120. The receiver 111 includes an antenna, converts (down-converts) a radio signal received by the antenna into a baseband signal (reception signal), and outputs the baseband signal to the controller 120. The transmitter 112 performs various types of transmission under control of the controller 120. The transmitter 112 includes an antenna, converts (up-converts) a baseband signal (transmission signal) output by the controller 120 into a radio signal, and transmits the radio signal from the antenna.

The controller 120 performs various types of control in the UE 100. The controller 120 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. The controller 130 may perform each processing operation in the UE 100 in each embodiment described below.

Configuration of Protocol Stack

Figure 6:
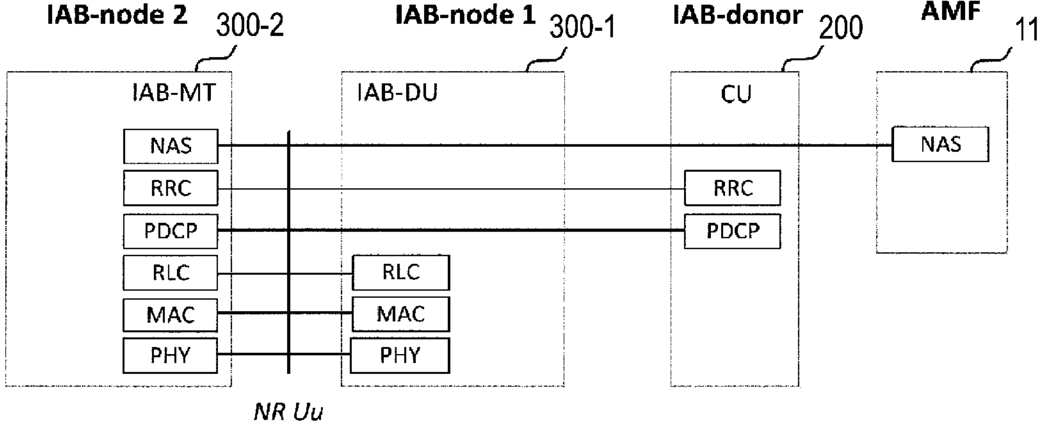
FIG. 6 is a diagram illustrating an example of a protocol stack related to an RRC connection and an NAS connection of IAB-MT.

In an embodiment, a configuration of a protocol stack will be described. FIG. 6 is a diagram illustrating an example of a protocol stack related to an RRC connection and an NAS connection of the IAB-MT.

As illustrated in FIG. 6, the IAB-MT of the IAB node 300-2 includes a physical (PHY) layer, a Medium Access Control (MAC) layer, a Radio Link Control (RLC) layer, a Packet Data Convergence Protocol (PDCP) layer, a Radio Resource Control (RRC) layer, and a Non-Access Stratum (NAS) layer.

The PHY layer performs coding and decoding, modulation and demodulation, antenna mapping and demapping, and resource mapping and demapping. Data and control information are transmitted between the PHY layer of the IAB-MT of the IAB node 300-2 and the PHY layer of the IAB-DU of the IAB node 300-1 via a physical channel.

The MAC layer performs preferential control of data, retransmission processing using a hybrid ARQ (HARQ), a random access procedure, and the like. Data and control information are transmitted between the MAC layer of the IAB-MT of the IAB node 300-2 and the MAC layer of the IAB-DU of the IAB node 300-1 via a transport channel. The MAC layer of the IAB-DU includes a scheduler. The scheduler determines transport formats (transport block sizes, modulation and coding schemes (MCSs)) and resource blocks to be allocated, in the uplink and the downlink.

The RLC layer transmits data to the RLC layer on the reception side by using functions of the MAC layer and the PHY layer. Data and control information are transmitted between the RLC layer of the IAB-MT of the IAB node 300-2 and the RLC layer of the IAB-DU of the IAB node 300-1 via a logical channel.

The PDCP layer performs header compression and decompression, and encryption and decryption. Data and control information are transmitted between the PDCP layer of the IAB-MT of the IAB node 300-2 and the PDCP layer of the donor gNB 200 via a radio bearer.

The RRC layer controls a logical channel, a transport channel, and a physical channel according to establishment, reestablishment, and release of a radio bearer. RRC signaling for various configurations is transmitted between the RRC layer of the IAB-MT of the IAB node 300-2 and the RRC layer of the donor gNB 200. With an RRC connection to the donor gNB 200, the IAB-MT is in an RRC connected state. With no RRC connection to the donor gNB 200, the IAB-MT is in an RRC idle state.

The NAS layer which is higher than the RRC layer performs session management, mobility management, and the like. NAS signaling is transmitted between the NAS layer of the IAB-MT of the IAB node 300-2 and the AMF 11.

Figure 7:
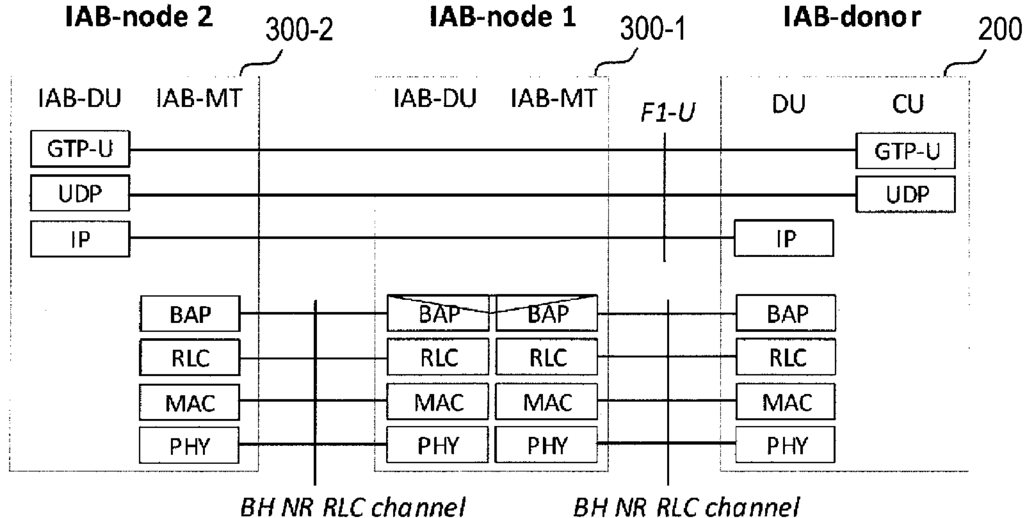
FIG. 7 is a diagram illustrating an example of a protocol stack related to an F1-U protocol.
Figure 8:
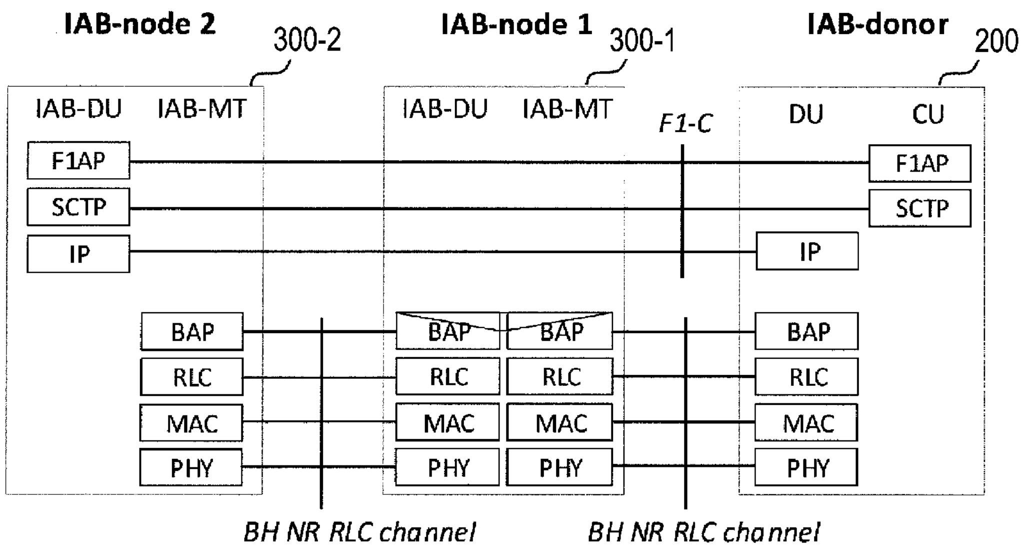
FIG. 8 is a diagram illustrating an example of a protocol stack related to an F1-C protocol.

FIG. 7 is a diagram illustrating a protocol stack related to an F1-U protocol. FIG. 8 is a diagram illustrating a protocol stack related to an F1-C protocol. Here, an example in which the donor gNB 200 is divided into the CU and the DU is illustrated.

As illustrated in FIG. 7, each of the IAB-MT of the IAB node 300-2, the IAB-DU of the IAB node 300-1, the IAB-MT of the IAB node 300-1, and the DU of the donor gNB 200 includes a Backhaul Adaptation Protocol (BAP) layer as an upper layer of the RLC layer. The BAP layer is a layer that performs routing processing and bearer mapping and demapping processing. In the backhaul, the IP layer is transmitted via the BAP layer to allow routing through multiple hops.

In each backhaul link, Protocol Data Units (PDUs) of the BAP layer are transmitted by the backhaul RLC channel (BH NR RLC channel). Configuring multiple backhaul RLC channels in each BH link enables the prioritization and QoS control of traffic. The association between the BAP PDU and the backhaul RLC channel is performed by the BAP layer of each IAB node 300 and the BAP layer of the donor gNB 200.

As illustrated in FIG. 8, the protocol stack of the F1-C protocol includes an F1AP layer and a Stream Control Transmission Protocol (SCTP) layer, instead of a GTP-U layer and a UDP layer illustrated in FIG. 7.

First Embodiment

First, failure detection and a recovery attempt therefor in a first embodiment will be described.

(Failure Detection and Recovery Attempt Therefor)

Figure 9:
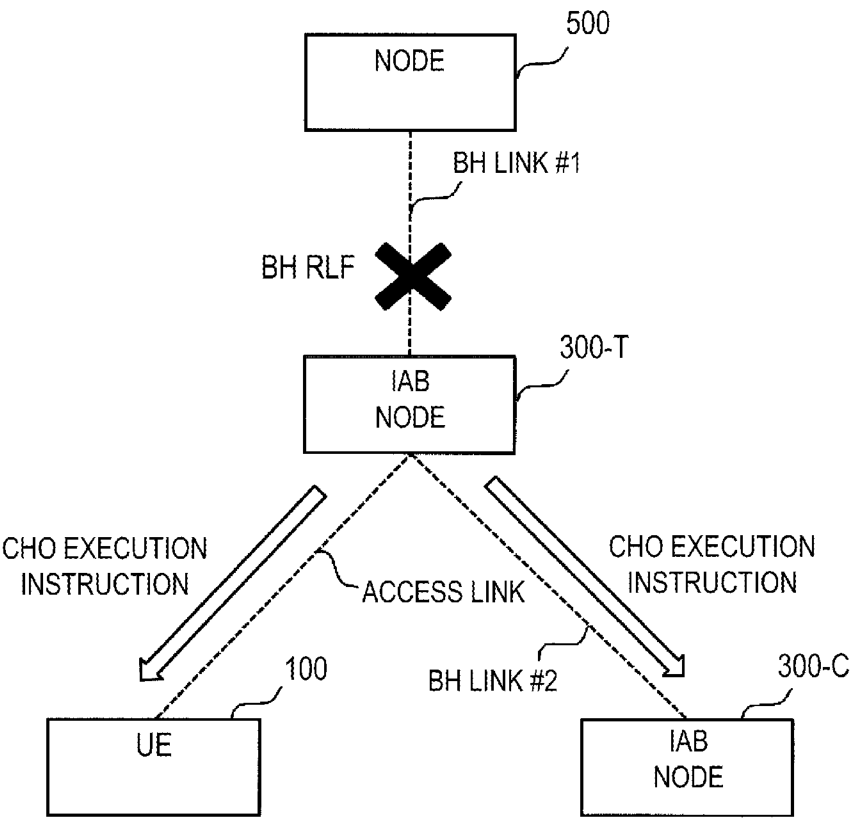
FIG. 9 is a diagram illustrating a configuration example of a cellular communication system according to a first embodiment.

FIG. 9 is a diagram illustrating a configuration example of a cellular communication system 1 according to the first embodiment.

The cellular communication system 1 illustrated in FIG. 9 includes a node 500, an IAB node 300-T, an IAB node 300-C, and a UE 100. The IAB node 300-C and the UE 100 may be communication apparatuses.

The node 500 is a parent node of the IAB node 300-T, and is the gNB 200 (or donor node. The "gNB 200" may hereinafter be referred to as the "donor node") or the IAB node 300 (parent IAB node). The IAB-MT of the IAB node 300-T has established a backhaul link (BH link) #1 with the node 500. The IAB-MT of the IAB node 300-T is in the RRC connected state.

The IAB node 300-C is a child node (child IAB node) of the IAB node 300-T. The IAB-MT of the IAB node 300-C has established a BH link #2 with the IAB node 300-T. The IAB-MT of the IAB node 300-C is in the RRC connected state. Alternatively, the IAB-MT of the IAB node 300-C may not have established the BH link #2 with the IAB node 300-T, and may be in the RRC idle state.

The UE 100 has established an access link with the IAB node 300-T. The UE 100 is in the RRC connected state. Alternatively, the UE 100 may not have established the access link with the IAB node 300-T, and may be in the RRC idle state.

In such a configuration, the IAB-MT of the IAB node 300-T is assumed to detect a Radio Link Failure (BH RLF) in the BH link #1. The IAB-MT of the IAB node 300-T detects the BH RLF, for example, as follows, and performs a recovery attempt to recover from the BH RLF.

Firstly, when detecting an out-of-sync state N310 consecutive times, the IAB-MT of the IAB node 300-T detects a radio problem and starts a timer T310. When detecting an in-sync state N311 consecutive times after the start of the timer T310, the IAB-MT of the IAB node 300-T stops the timer T310.

Secondly, when the timer T310 expires without being stopped, the IAB-MT of the IAB node 300-T detects an RLF and starts a timer T311 (i.e., starts RRC reestablishment processing), and performs cell selection processing in order to recover the BH link. When selecting an appropriate cell by the cell selection processing and recovering the BH link for the selected cell, the IAB-MT of the IAB node 300-T stops the timer T311. The appropriate cell refers to a cell that satisfies at least minimum radio quality standards.

Thirdly, when the timer T311 expires with the recovery of the BH link being unsuccessful, the IAB-MT of the IAB node 300-T transitions to the RRC idle state. Failed recovery from a BH RLF after detection of the BH RLF (i.e., expiration of the timer T311) may be hereinafter referred to as failed recovery of BH link.

Here, when detecting the BH RLF, the IAB-DU of the IAB node 300-T can notify Type 1 Indication (RLF detected) to the IAB-MT of the IAB node 300-C and the UE 100. The Type 1 Indication is an example of a failure occurrence notification indicating the detection of a BH RLF.

When detecting an operation of recovering from the BH RLF, the IAB-DU of the IAB node 300-T can notify the Type 2 Indication (Trying to recover) to the IAB-MT of the IAB node 300-C and the UE 100. Type 2 Indication is an example of a failure occurrence notification indicating that the recovery from the BH RLF is being attempted.

When not distinguishing between the Type 1 Indication and the Type 2 Indication, the IAB-DU of the IAB node 300-T can transmit Type 1/2 Indication to the IAB-MT of the IAB node 300-C and the UE 100. The Type 1/2 Indication is also an example of the failure occurrence notification.

Furthermore, types of notification in the IAB node 300-T include Type 3 Indication (RLF recovered) and Type 4 Indication (Recovery failure). The Type 3 Indication is a recovery notification indicating that the IAB node 300-T has recovered from the BH RLF. The Type 4 Indication is an example of a recovery failure notification indicating that the IAB node 300-T has failed in recovery from the BH RLF.

In the BH link, each Indication may be included in a BAP Control PDU or a MAC CE for transmission. In the access link, each Indication may be included in an SIB1 for transmission.

On the other hand, even when the IAB-MT of the IAB node 300-T detects a BH RLF in the BH link #1, the radio state of the BH link #2 and the radio state of the access link may be good. Accordingly, the IAB node 300-C and the UE 100 may remain in the cell of the IAB node 300-T having detected the BH RLF.

Thus, in the first embodiment, the IAB node 300-T transmits, to at least one of the IAB node 300-C or the UE 100, a notification instructing execution of a conditional handover.

Specifically, firstly, upon detecting occurrence of a failure in a backhaul link between a relay node and a parent node of the relay node, the relay node transmits the notification instructing the execution of the conditional handover. Secondly, the communication apparatuses receive the notification. The communication apparatuses are, for example, the IAB node 300-C and the UE 100. Thus, for example, when the IAB node 300-T detects the occurrence of a failure in the backhaul link, the IAB node 300-C or the UE 100 can perform a conditional handover to switch the connection to another IAB node.

The conditional handover will be described.

Conditional Handover

In the cellular communication system 1 illustrated in FIG. 9, the IAB-MT of the IAB node 300-C is assumed to be in the RRC connected state, and the conditional handover is assumed to be configured for the IAB-MT of the IAB node 300-C. The conditional handover is handover performed when one or more handover execution conditions (or trigger conditions) are met. The configuration of the conditional handover includes a candidate cell for handover and a handover trigger condition. The configuration of the conditional handover may include pluralities of combinations of a candidate cell and a trigger condition. The configuration of the conditional handover further includes an RRC configuration corresponding to the candidate cell.

In a typical handover, the UE 100 reports, to the gNB 200, the measured value of the radio state of the serving cell and/or a neighbor cell, and based on this report, the gNB 200 determines the handover to the neighbor cell and transmits a handover instruction to the UE 100. Accordingly, when the radio state of the serving cell is rapidly degraded, in the typical handover, communication breakdown may occur before the handover is performed. In contrast, in the conditional handover, when a preconfigured trigger condition is satisfied, a handover to the candidate cell corresponding to the trigger condition can autonomously be performed.

Accordingly, problems with the typical handover such as communication disruption can be solved.

As the trigger condition, for example, at least one of an event referred to as event A3 or an event referred to as event A5 is specified. The event A3 is an event where the radio state of the neighbor cell is better than the radio state of the serving cell by a predetermined amount (predetermined offset) or more. The event A5 is an event where the radio state of the serving cell is worse than a first threshold, and the radio state of the neighbor cell is better than a second threshold.

Operation Example

In the first embodiment, an operation example will be described.

Figure 10:
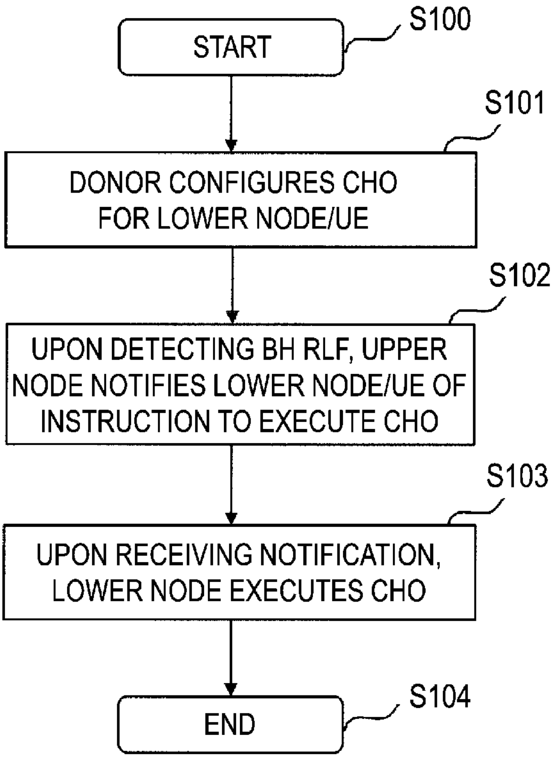
FIG. 10 is a diagram illustrating an operation example of the first embodiment.

FIG. 10 is a diagram illustrating an operation example according to the first embodiment. The operation example illustrated in FIG. 10 illustrates an operation example in the cellular communication system 1 in FIG. 9. Hereinafter, the IAB node 300-T illustrated in FIG. 9 may be referred to as the upper node 300-T, and the IAB node 300-C may be referred to as the lower node 300-C.

As illustrated in FIG. 10, in step S100, the cellular communication system 1 starts processing.

In step S101, the donor node configures a Conditional Handover (CHO) for the lower node 300-C and the UE 100. In the first embodiment, a trigger condition included in the configuration of the conditional handover may include "reception of a notification instructing execution of a conditional handover".

Note that the configuration of the conditional handover may be performed by unicast signaling (for example, an RRC Reconfiguration message or the like) from the CU of the donor node to the IAB-DU of the lower node 300-C and the UE 100.

In step S102, upon detecting a BH RLF, the upper node 300-T transmits, to the lower node 300-C and UE 100, the notification instructing the execution of the conditional handover. The notification instructing the execution of the conditional handover may be included in a message of the BAP layer, for example, a BAP Control Protocol Data Unit (PDU). Alternatively, the execution instruction may be included in a MAC Control Element (MAC CE). The IAB-MT of the lower node 300-C connected to the IAB-DU of the upper node 300-T can receive, from the IAB-DU of the upper node 300-T, the message of the BAP layer including the execution instruction. On the other hand, the UE 100 includes no BAP layer and thus fails to receive the message of the BAP layer. Accordingly, the IAB-DU of the upper node 300-T includes the execution instruction in a system information block type 1 (System Information Block (SIB1)) for transmission. Thus, not only the lower node 300-C but also the UE 100 can receive the execution instruction.

Note that for the notification in step S102, the donor node may configure whether to perform the notification. This can be realized by the CU of the donor node performing such configuration for the IAB-DU of the upper node 300-T by signaling. Alternatively, the upper node 300-T may execute step S102 only when the IAB node 300-C or the UE 100 exists under the upper node 300-T. Such configuration may also be performed by the CU of the donor node.

In step S103, in response to receiving the notification instructing the execution of the conditional handover, the lower node 300-C executes the conditional handover. This satisfies "reception of a notification instructing execution of a conditional handover", corresponding to one of the trigger conditions for the conditional handover, and thus the lower node 300-C executes handover.

Alternatively, upon receiving the notification, the lower node 300-C may regard the received power (for example, Reference Signal Received Power (RSRP) or the like) from the serving cell as "zero" (=−∞dBM), and may invoke the event A3 or the event A5. Even when "reception of a notification instructing execution of a conditional handover" is not included as a trigger condition, processing of regarding the received power from the serving cell as "zero" in response to the reception of the notification causes the condition of the event A3 or event A5 to be satisfied, allowing the lower node 300-C to perform the handover.

Alternatively, upon receiving the notification, the lower node 300-C may apply a Time to Trigger (TTT) or wait for execution of the conditional handover for a certain period of time. Subsequently, in response to receiving a notification indicating cancellation of the instruction to execute the conditional handover, from the upper node 300-T during the period of time, the lower node 300-C cancels the trigger condition and does not execute the conditional handover. Note that the TTT may be configured by the CU of the donor node in step S101.

In step S104, the cellular communication system 1 ends a series of processing operations.

Second Embodiment

In the example described in the first embodiment, the lower node 300-C performs handover in response to reception of the instruction to execute the conditional handover. A second embodiment further includes examples, other than the event A3 or event A5, as the trigger condition.

Such a trigger condition may include "reception of the Type 1 Indication". For example, in response to reception of the Type 1 Indication from the upper node 300-T, which satisfies the trigger condition for the conditional handover, the lower node 300-C or the UE 100 performs the handover. When the upper node 300-T detects a failure (BH RLF), the lower node 300-C or the UE 100 is to perform handover to another IAB node 300.

The trigger condition may include "reception of the Type 2 Indication". For example, in response to reception of the Type 2 Indication from the upper node 300-T, which satisfies the trigger condition for the conditional handover, the lower node 300-C or the UE 100 performs the handover. Upon detecting that the upper node 300-T is performing an operation of recovering from the failure (BH RLF), the lower node 300-C or the UE 100 performs handover to another IAB node 300.

Furthermore, the trigger condition may include "reception of the Type 4 Indication". For example, in response to reception of the Type 4 Indication from the upper node 300-T, which satisfies the trigger condition for the conditional handover, the lower node 300-C or the UE 100 performs handover. When the upper node 300-T detects a failure in recovery from the failure (BH RLF), the lower node 300-C or the UE 100 is to perform handover to another IAB node 300.

Such a configuration may be performed, for example, in step S101 (FIG. 10) of the first embodiment. The CU of the donor node configures, for the IAB-DU of the lower node 300-C or the UE 100, a conditional handover with reception of the Type 1, Type 2, or Type 4 Indication as a trigger condition.

Third Embodiment

There is an argument in that, when the IAB node 300 receives the Type 1/2 Indication, the IAB node 300 should quickly recover the entire topology of the IAB node 300 by transmitting the received Type 1/2 Indication to the lower nodes of the IAB node 300.

However, in response to the reception of the Type 1/2 Indication, the lower nodes may simultaneously start RRC Reestablishment or the like. In this case, all the IAB nodes 300 in the topology may switch connections with other IAB nodes by the RRC reestablishment or the like. As a result, the topology of the IAB node 300 may collapse.

In other words, when all the IAB nodes 300 in the topology forward Type 1/2 Indication, even an IAB node that needs not execute the RRC reestablishment or the like may perform the RRC reestablishment or the like. In the first place, even when all the IAB nodes 300 execute the RRC reestablishment or the like, signaling may not reach the donor node due to disturbance in the connections. Thus, such processing may be unsuccessful. Furthermore, such processing may lead to a centrally uncontrollable state because the IAB is originally performed by centralized processing by the donor node.

Thus, in a third embodiment, Type 1/2 Indication includes forwarding availability information. Alternatively, Type 1/2 Indication includes forward hop count information.

Specifically, firstly, upon detecting occurrence of a failure in the backhaul link between a first relay node and a parent node of the first relay node, the first relay node includes, in a failure occurrence notification indicating the occurrence of the failure, forwarding availability information indicating whether to forward the failure occurrence notification, and transmits the failure occurrence notification to the second relay node.

Secondly, the second relay node forwards or does not forward the failure occurrence notification received from the first relay node in accordance with the forwarding availability information.

Thus, for example, the IAB node 300 properly forwards Type 1/2 Indication, allowing the topology to be quickly recovered and enabling effects on the entire topology to be minimized.

Figure 11:
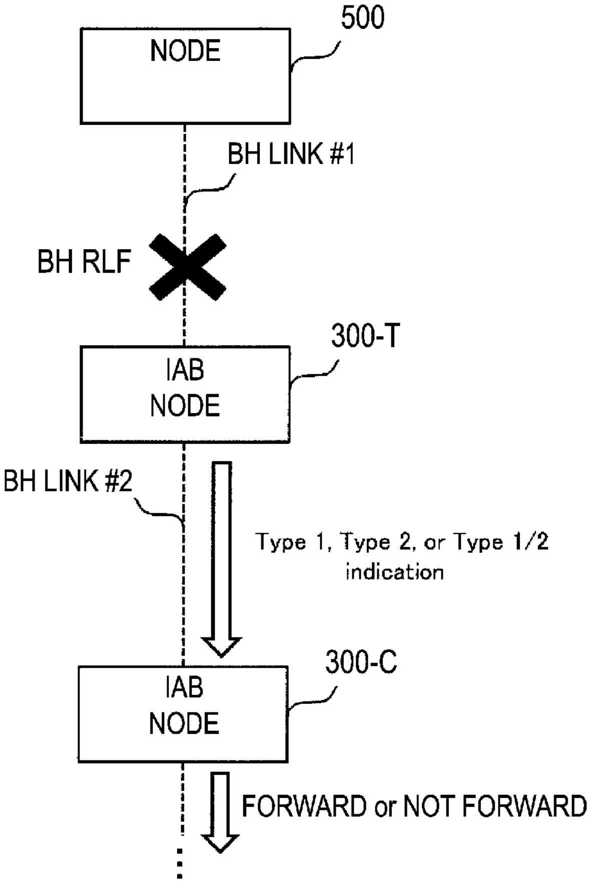
FIG. 11 is a diagram illustrating a configuration example of a cellular communication system according to a third embodiment.

FIG. 11 is a diagram illustrating a configuration example of the cellular communication system 1 in the third embodiment. As illustrated in FIG. 11, the IAB-MT of the IAB node (or upper node) 300-T detects a failure in the BH link #1 with the node 500 or the like by using the method described in the first embodiment. The IAB-DU of the IAB node 300-T transmits, to the IAB-MT of the IAB node 300-C as the lower node, the Type 1 Indication, Type 2 Indication, or Type 1/2 Indication including the forwarding availability information and the like. The lower node 300-C forwards or does not forward the received Indication to a further lower IAB node 300, in accordance with the forwarding availability information and the like included in the Indication.

Figure 12:
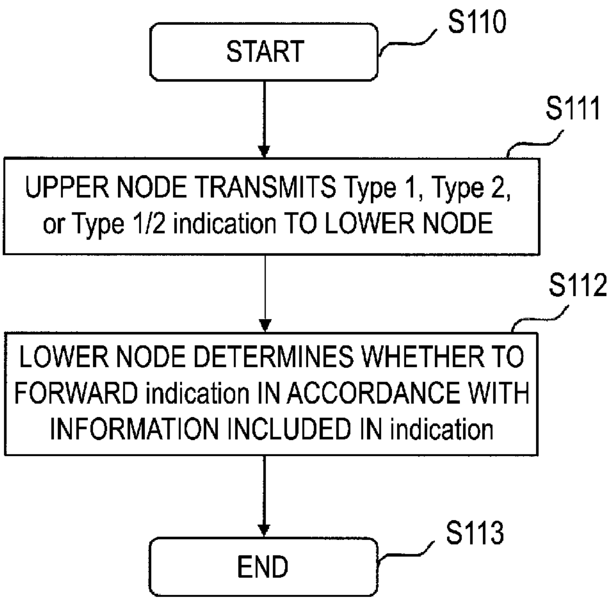
FIG. 12 is a diagram illustrating an operation example of the third embodiment.

FIG. 12 is a diagram illustrating an operation example of the third embodiment.

As illustrated in FIG. 12, in step S110, the cellular communication system 1 starts processing.

In step S111, when the IAB-MT of the IAB node 300-T detects a BH RLF in the BH link #1 of the IAB node 300-T, the IAB-DU of the IAB node 300-T transmits the Type 1 Indication to the IAB-MT of the lower node 300-C. In step S111, when the IAB-MT of the IAB node 300-T detects that an operation of restoration of the BH RLF is started in the BH link #1, the IAB-DU of the IAB node 300-T transmits the Type 2 Indication to the IAB-MT of the lower node 300-C. Note that when not distinguishing between the Type 1 Indication and the Type 2 Indication, the IAB-DU of the IAB node 300-T transmits the Type 1/2 Indication to the IAB-MT of the lower node 300-C.

Here, the Type 1 Indication, the Type 2 Indication, and the Type 1/2 Indication include the following information.

That is, the Indications include Indication type information (classification information). The Type 1 Indication includes classification information indicating Type 1. Note that the types of Indication also include the Type 3 Indication and the Type 4 Indication. Accordingly, the classification information may also include the types of these Indications.

These Indications include forwarding availability information indicating whether to forward the Indication. For example, “0” indicates that forward is disabled, and “1” indicates that forward is enabled (forward is performed). Alternatively, the Indication may include information indicating whether the Indication has been transmitted in response to a BH RLF in the IAB node 300. As the information, for example, “0” may indicate a BH RLF in the IAB node 300, and “1” may indicate a BH RLF in the parent node of the IAB node 300. In the example of FIG. 11, when the IAB node 300-T detects a BH RLC in the BH link #1 of the IAB node 300-T and transmits the Type 1 Indication to the lower node 300-C, the IAB node 300-T includes “0”, as this information, in the Type 1 Indication and then forwards the Type 1 Indication, and the lower node 300-C includes “1”, as this information, in the Type 1 Indication and then forwards the Type 1 Indication. Alternatively, the Indication may include information indicating whether the Indication has been transmitted in response to Indication from the upper node 300-T. In this case, upon receiving the Type 1 Indication from the upper node 300-T, the lower node 300-C forwards, to a further lower node, the Type 1 Indication including the information indicating that the Indication has been transmitted in response to the Indication from the upper node 300-T.

Alternatively, these Indications may include forward hop information. For example, in FIG. 11, the IAB node 300-T is assumed to be the highest IAB node on a predetermined topology. In this case, when the IAB-MT of the IAB node 300-T detects the BH RLF, the Type 1 Indication including “0” as the forward hop count information is transmitted. Each time forward is performed, the number of forward hops is incremented. Each IAB node 300 includes the incremented number of forward hops in the Type 1 Indication and then forwards the Type 1 Indication to a further lower node. The upper limit value of the number of forward hops may be configured by the CU of the donor node for the IAB-DU (or the IAB-MT) of each IAB node 300 through signaling. The IAB-DU of each IAB node 300 compares the forward hop count information included in each received Indication with the upper limit value, and forwards or does not forward the received Indication according to the comparison result. For example, if the forward hop count information is the same as the upper limit value, the IAB-DU of the IAB node 300 does not forward the received Indication, whereas if the number of forward hops is smaller than the upper limit value, the IAB-DU forwards the received Indication.

Referring back to FIG. 12, in step S112, the lower node 300-C determines whether to forward the received Indication to a further lower IAB node 300 in accordance with the information included in the received Indication. The lower node 300-C forwards or does not forward the received Indication in accordance with the determination.

For example, when the Indication includes forwarding availability information, the following is performed. That is, the IAB-DU of the lower node 300-C does not forward the received Indication when the Indication includes “0” as the forwarding availability information. On the other hand, the IAB-DU of the lower node 300-C forwards the received Indication to a further lower node when the Indication includes “1” as the forwarding availability information.

For example, when the Indication includes the information of the number of forward hops, the following is performed. In other words, the IAB-DU of the lower node 300-C compares the forward hop count information included in each received Indication with the upper limit value. The IAB-DU does not forward the received Indication if the forward hop count information is the same as the upper limit value. On the other hand, if the number of forward hops is smaller than the upper limit value, the IAB-DU of the lower node 300-C forwards the received Indication. Alternatively, when the number of forward hops exceeds the upper limit value, the IAB-DU of the lower node 300-C may determine not to forward the received Indication. When the number of forward hops is equal to or smaller than the upper limit value, the IAB-DU of the lower node 300-C may forward the received Indication.

In step S113, the cellular communication system 1 ends a series of processing operations.

In the example described in the third embodiment as above, when the Indication such as the Type 1 Indication is forwarded, the Indication includes the forwarding availability information. For example, the notification instructing the execution of a conditional handover as described in the first embodiment may be forwarded instead of each Indication such as the Type 1 Indication. In this case, the IAB node 300-T may transmit the notification including the forwarding availability information or including the forward hop count information.

Fourth Embodiment

3GPP has been discussing route priority with respect to the IAB. The route priority is, for example, in the IAB, a priority configured for each of a plurality of routes (which may hereinafter be referred to as the “routes”) configured for the same destination.

Figure 13:
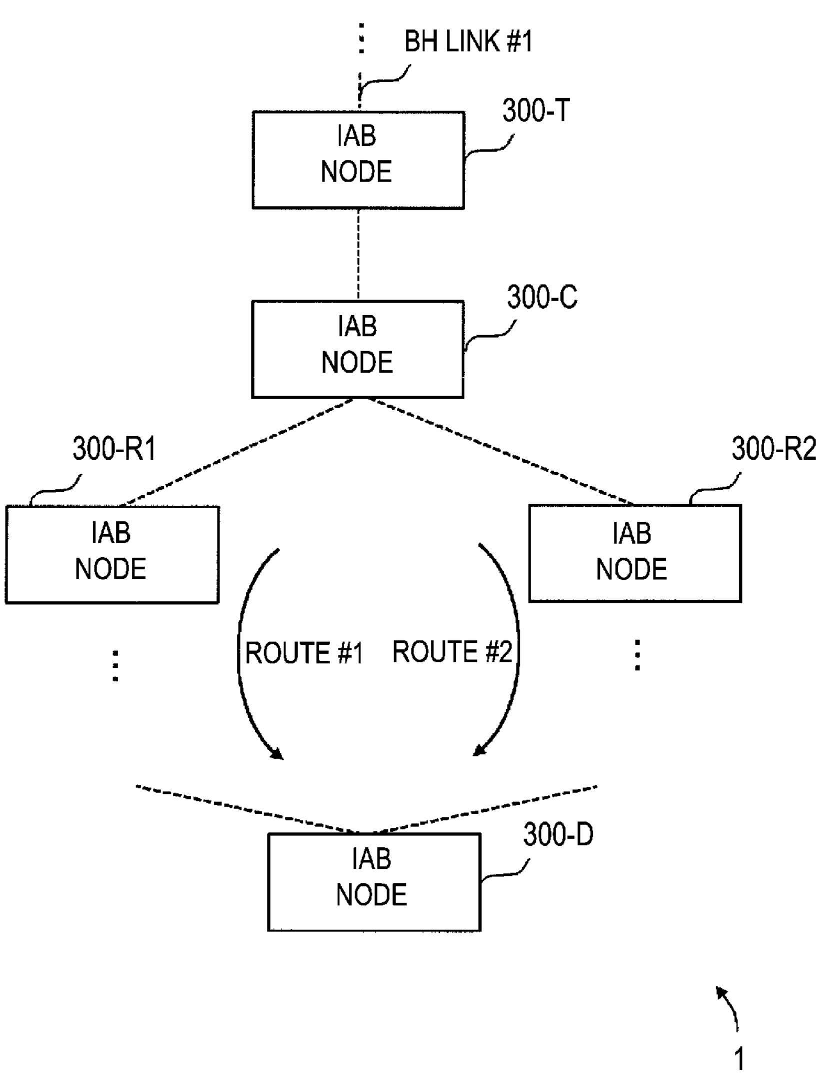
FIG. 13 is a diagram illustrating a configuration example of a cellular communication system according to a fourth embodiment.

FIG. 13 is a diagram illustrating an example of the cellular communication system 1 according to a fourth embodiment. The IAB node 300-T is an upper node and the IAB node 300-C is a lower node. Further lower nodes of the lower node 300-C include a plurality of IAB nodes 300-R1, 300-R2, . . . , and 300-D. In this case, on the lower side of the lower node 300-C, route #1 from the IAB node 300-R1 to the IAB node 300-D exists. On the lower side of the lower node 300-C, route #2 from the IAB node 300-R2 to the IAB node 300-D exists. For example, a priority “1” (=highest priority) is configured for route #1, and a priority “2” (=a priority lower than the priority “1”, and since only two routes are present, the priority “2” is the lowest priority) is configured for route #2. With respect to the priority, for example, the highest priority may be assigned to a route having the smallest number of hops. Note that such priorities can be configured by the CU of the donor node through signaling to the IAB-DU of each IAB node 300.

In the fourth embodiment, upon receiving, for example, the Type 1/2 Indication from the upper node 300-T, the lower node 300-C changes the route priority configured for each route, and subsequently upon receiving the Type 3 Indication, the lower node 300-C turns the route priority back to the state before the change.

Specifically, firstly, in transmitting a failure occurrence notification indicating that a failure has occurred in the backhaul link or a recovery failure notification indicating that recovery from the failure has failed in the backhaul link, the first relay node transmits, to the second relay node, a first request requesting a change in route priority.

Secondly, the second relay node changes, in response to receiving the first request, the priority of the first route from the second relay node to a fourth relay node via a third relay node and/or the priority of the second route from the second relay node to the fourth relay node via a fifth relay node.

Thirdly, the second relay node transmits the packet in accordance with the changed priority of the first route and/or the changed priority of the second route.

Figure 14:
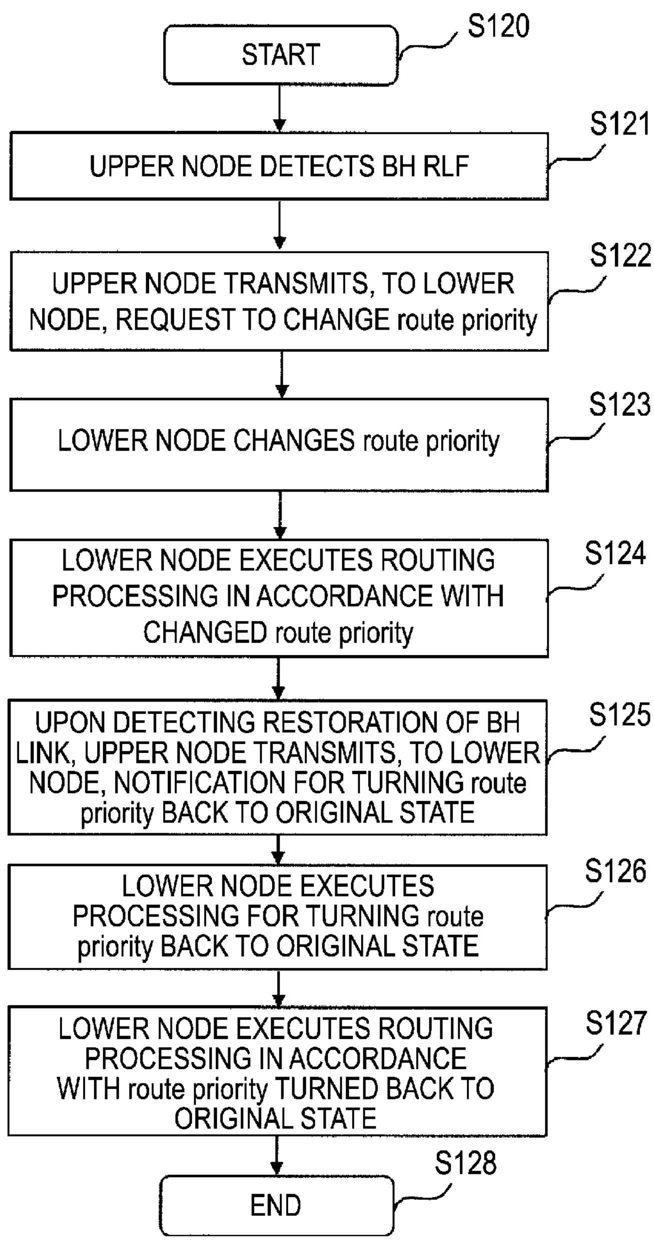
FIG. 14 is a diagram illustrating an operation example of the fourth embodiment.

FIG. 14 is a diagram illustrating an operation example of the fourth embodiment.

As illustrated in FIG. 14, in step S120, the cellular communication system 1 starts processing.

In step S121, the upper node 300-T detects an RLF in the BH link #1. Alternatively, the upper node 300-T may detect a failure in recovery from the RLF in the BH link #1. Alternatively, the upper node 300-T may receive the Type 1/2 Indication transmitted from a further upper IAB node 300. Alternatively, the upper node 300-T may receive the Type 4 Indication transmitted from the further upper IAB node 300.

In step S122, the upper node 300-T transmits, to the lower node 300-C, a notification indicating a request to change the route priority. For example, in step S121, upon detecting an RLF in the BH link #1, the upper node 300-T transmits the Type 1/2 Indication to the lower node 300-C. In this case, the Type 1/2 Indication itself may indicate a request to change the route priority. Alternatively, the Type 1/2 Indication may include an indicator indicating whether to change route priority. For example, when the upper node 300-T detects a failure in recovery from the RLF in the BH link #1, the upper node 300-T transmits the Type 4 Indication to the lower node 300-C. The Type 4 Indication itself may indicate a request to change the route priority. Alternatively, the Type 4 Indication may include an indicator indicating whether to change the route priority. For example, the upper node 300-T may transmit, to the lower node 300-C, the Type 1/2 Indication or Type 4 Indication received from a further upper IAB node 300. The Type 1/2 Indication or the Type 4 Indication itself may indicate a request to change the route priority, or each Indication may include an indicator indicating whether to change the route priority.

Note that the notification indicating the request to change the route priority may be transmitted using a BAP Control PDU, an SIB1, a MAC CE, or the like.

In step S123, the lower node 300-C changes the route priority. An example of changing the route priority is as follows.

1) The lower node 300-C may regard the priority of the route with the currently highest priority (route #1) as the lowest priority. In this case, in the example of FIG. 13, route #1 has the lowest priority and route #2 has the highest priority.
2) The lower node 300-C may regard the priority of the route with the currently second priority as the highest priority. In this case, in the example of FIG. 13, route #2 having the second priority becomes the highest priority.
3) Furthermore, the lower node 300-C may lower the priority of the route with the currently highest priority by one or several levels. In this case, in the example of FIG. 13, when the priority is lowered by two levels, the lower node 300-C changes the priority of route #1 from "1" to "3". As a result, the priority of route #1 after the change is lower than the priority "2" of route #2, and route #2 is prioritized over route #1.
4) Furthermore, the lower node 300-C may raise the priorities of the routes other than the currently highest priority by one or several levels. In this case, in the example of FIG. 13, when the priority is raised by two levels, the lower node 300-C changes the priority of route #2 from "2" to "0". As a result, route #2 has the highest priority and thus has a higher priority than route #1.

Note that these changes in route priority may be temporary. The lower node 300-C may change not only the priorities of some of the routes but also the priorities of all of the routes, for example, by combining any of 1) to 4) described above.

Referring back to FIG. 14, in step S124, the lower node 300-C executes routing processing on packets in accordance with the changed route priorities. For example, in the example of FIG. 13, the IAB-MT of the lower node 300-C transmits the packet addressed to the IAB node 300-D to the IAB node 300-R2 on route #2 rather than to the IAB node 300-R1 on route #1.

Referring back to FIG. 14, in step S125, upon detecting the restoration of the BH link #1, the upper node 300-T transmits, to the lower node 300-C, a notification indicating that the route priority is to be turned back to the state before the change. The notification may be the Type 3 Indication itself. In other words, the Type 3 Indication itself may be a notification indicating that the route priority is turned back to the original state before the change. Alternatively, the Type 3 Indication may include an indicator indicating that the route priority is turned back to the state before the change.

In addition to the BH link #1, the upper node 300-T may detect the restoration of the backhaul link by receiving the Type 3 Indication transmitted from a further upper IAB node 300 of the upper node 300-T. Also in this case, the upper node 300-T transmits a notification indicating that the route priority is turned back to the state before the change. The lower node 300-C may execute processing for turning the route priority back to the state before the change based on the successful recovery of the BH link of the lower node 300-C. For example, when RRC Reestablishment for another parent node is successful, or the like, the lower node 300-C executes processing for turning the route priority back to the state before the change.

In step S126, the lower node 300-C executes processing for turning the route priority back to the original state before the change. For example, the IAB-DU (or IAB-MT) of the lower node 300-C may change the route priority configured in step S123 to the priority configured by the donor node. Alternatively, the IAB-DU of the lower node 300-C may request the CU of the donor node to turn the route priority back to the state before the change. In this case, the CU of the donor node may transmit again, to the IAB-DU of the lower node 300-C, a routing configuration transmitted before the change in route priority, leading to reconfiguration of the route priority before the change.

In step S127, the lower node 300-C executes packet routing processing in accordance with the route priority before the change in route priority. For example, in the example of FIG. 13, the lower node 300-C changes the transmission destination of the packet addressed to the IAB node 300-D from the IAB node 300-R2 on route #2 to the IAB node 300-R1 on route #1.

Referring back to FIG. 14, in step S128, the cellular communication system 1 ends a series of processing operations.

Note that, although the example of the Type 1/2 Indication has been described in the fourth embodiment, the Type 1/2 Indication may be replaced with the Type 1 Indication or the Type 2 Indication.

Fifth Embodiment

In a fifth embodiment, upon receiving the Type 1/2 Indication from the upper node 300-T, the IAB node (or lower node) 300-C deactivates the configuration of a main path and activates configuration of an alternative path for the main path.

Specifically, firstly, the second relay node receives, from the first relay node, a failure occurrence notification indicating that a failure has occurred in the backhaul link. Secondly, in response to the reception of the failure occurrence notification, the second relay node deactivates the configuration of the main path and activates the configuration of the alternative path for the main path.

For example, in FIG. 13, the path of route #1 is the main path, and the path of route #2 is the alternative path. Such a configuration is enabled by the CU of the donor node providing a routing configuration to the IAB-DU of the IAB node 300-C. The routing configuration includes, for example, the BAP address of each IAB node 300 on the main path and the BAP address of each IAB node 300 on the alternative path. The former may be information related to the configuration of the main path, and the latter may be information related to the configuration of the alternative path.

Figure 15:
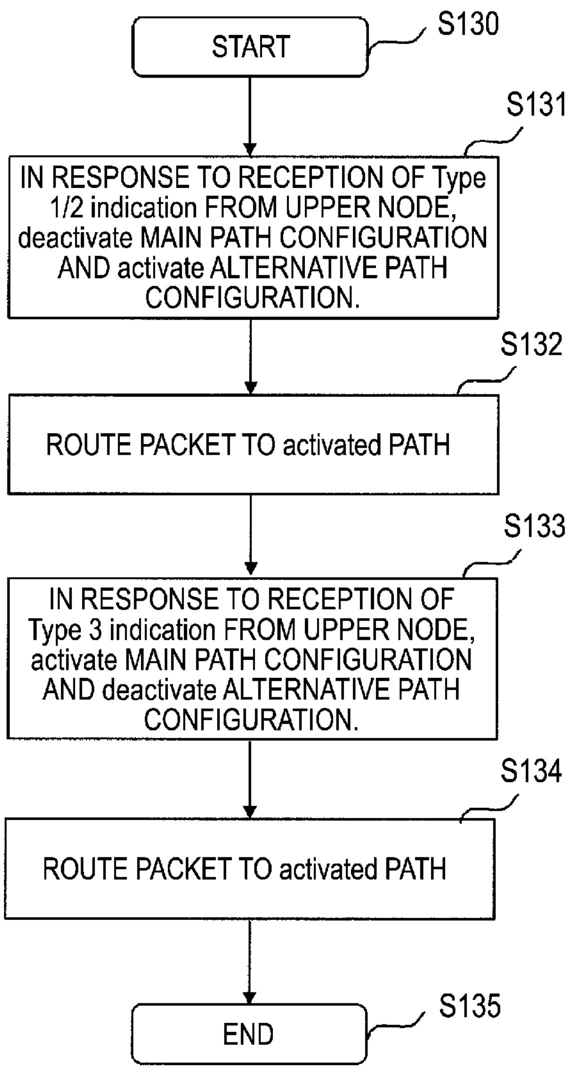
FIG. 15 is a diagram illustrating an operation example of a fifth embodiment.

FIG. 15 is a diagram illustrating an operation example of the fifth embodiment.

As illustrated in FIG. 15, in step S130, the IAB node 300-C starts processing.

In step S131, upon receiving the Type 1/2 Indication from the upper node 300-T, the IAB node 300-C deactivates the configuration of the main path and activates the configuration of the alternative path. For example, the IAB-DU of the IAB node 300-C stops reading the information related to the configuration of the main path stored in the memory, and starts reading the information related to the configuration of the alternative path stored in the memory.

In step S132, the IAB node 300-C routes packets to the activated path. For example, based on the information related to the configuration of the alternative path, the IAB-DU of the IAB node 300-C transmits packets received from the upper node 300-T to the IAB-MT of the IAB node 300-R2.

In step S133, upon receiving the Type 3 Indication from the upper node 300-T, the IAB node 300-C activates the configuration of the main path and deactivates the configuration of the alternative path. For example, the IAB-DU of the IAB node 300-C starts reading the information related to the configuration of the main path stored in the memory, and stops reading the information related to the configuration of the alternative path stored in the memory.

In step S134, the IAB node 300-C routes packets to the activated path. For example, based on the information related to the configuration of the main path, the IAB-DU of the IAB node 300-C transmits packets received from the upper node 300-T to the IAB-MT of the IAB node 300-R1.

Then, in step S135, the IAB node 300-C ends a series of processing operations.

Note that, although the example of the Type 1/2 Indication has been described in the fifth embodiment, the Type 1/2 Indication may be replaced with the Type 1 Indication or the Type 2 Indication.

Other Embodiments

A program causing a computer to execute each of the processes performed by the UE 100 or the gNB 200 may be provided. The program may be recorded on a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing the processing operations to be performed by the UE 100 or the gNB 200 may be integrated, and at least part of the UE 100 or the gNB 200 may be configured as a semiconductor integrated circuit (a chipset or an SoC (System on a chip)).

Although an embodiment has been described in detail with reference to the drawings, a specific configuration is not limited to those described above, and various design changes and the like can be made without departing from the gist. All of or a part of the embodiments can be combined together as long as the combination remains consistent.

Supplementary Note

Introduction

A revised work item related to NR Enhancements to Integrated Access AND Backhaul (NR eIAB) was approved. Some of the purposes thereof are as follows.

Enhancements of Topology Adaptation

- Specification of procedures for inter-donor IAB-node migration to enhance robustness and load-balancing, including enhancements to reduce signaling load.
- Specification of enhancements to reduce service interruption due to IAB-node migration and BH RLF recovery.
- Specification of enhancements to topology redundancy, including support for CP/UP separation.
- Enhancements of topology, routing, and transport.
- Specification of enhancements to improve topology-wide fairness, multi-hop latency, and congestion mitigation.

In Supplementary Notes, a matter to be considered regarding the topology adaptation enhancements of a Rel-17 eIAB will be discussed from the viewpoint of assumption of backhaul link quality, enhancements of BH RLF indication, BH RLF recovery and cell (re)selection, and enhancements of lossless delivery.

Discussion

Assumption of Backhaul Link Quality

In the stage of research of Rel-15, as one background of the requirements, TR states the following: "Radio backhaul links are vulnerable to obstructions caused by a moving object such as a vehicle, change of seasons (leaves), change of infrastructure (new buildings), and the like. Such vulnerabilities also apply to physically stationary IAB nodes." Thus, as has been captured in TR, various problems caused by multi-hop/radio backhaul and potential solutions for the problems were researched.

Finding 1: In the research of Rel-15, various problems caused by unstable backhaul links and potential solutions for the problems were identified, which were fully captured in TR 38.874.

In normative work of Rel-16, it was assumed that the IAB nodes are motionless, that is, "stationary IAB nodes". Accordingly, the backhaul (BH) was sufficiently stable in appropriately designed deployment even in a case of a backhaul link via millimeter waves and/or a local area IAB node that may be deployed with an unmanaged method. Thus, only a recovery procedure combined with basic functions of the BH RLF was defined. The basic functions are existing functions such as BH RLF indication (also known as Type 4 that is "Recovery failure") and RRC reestablishment, MCG/SCG failure indication, and/or a conditional handover.

Finding 2: In a Rel-16 IAB, only a stationary IAB node including a sufficiently stable backhaul link was assumed.

In enhancements of Rel-17, one intended use case is a "mobile IAB node", which may be a part of "inter-donor IAB-node migration" even if not explicitly described in WID. Furthermore, secondary purposes in WID such as "enhancements for reducing service interruptions due to IAB-node migration and BH RLF recovery" and "enhancements for topology redundancy" clearly intend that the BH link becomes unstable, for example, due to obstruction by millimeter waves, and the migration and BH RLFs frequently occur in the scenario of Rel-17 deployment. Therefore, according to the discussion of Rel-17, first, RAN2 should have common understanding about assumption of the BH link.

Proposal 1: RAN2 should assume that quality of the backhaul link dynamically changes. Thus, a backhaul RLF is not a rare case in the Rel-17 eIAB.

Enhancements of BH RLF Indication

Additional Indications (Type 2 and Type 3)

In email discussion in Rel-16, four types of BH RLF notifications as illustrated in FIG. 16 were discussed.

Ultimately, only "Recovery failure" corresponding to Type 4 was defined as the BH RLF indication in Rel-16. This allows a child IAB-MT to recognize an RLF on the BH link to initiate an RLF recovery procedure.

Finding 3: In Rel-16, only "Recovery failure" corresponding to Type 4 was defined as the BH RLF indication.

On the other hand, many companies still find other types of indications beneficial, and thus this was further discussed via email. Eight out of thirteen companies preferred introduction of "Trying to recover" corresponding to Type 2, and other two companies thought this would be discussed in Rel-17. Therefore, in conclusion, most companies are ready for introduction of the Type 2 Indication into Rel-17. Even when the Type 2 Indication can be introduced, a method for transmitting the Type 2 Indication requires further study; the method may include using the BAP Control PDU, the SIB1, or both of these. Note that Type 1 and Type 2 have the same meaning.

Proposal 2: RAN2 should agree with the fact that "Trying to recover" corresponding to Type 2 of the BH RLF indication has been introduced. Whether the transmission is performed using the BAP Control PDU, the SIB1, or both of these requires further study.

Nine out of thirteen companies agreed to hold a discussion on "BH link recovered" corresponding to Type 3 in Rel-17 as well. When the Type 2 Indication is introduced as in Proposal 2, and the parent BH link recovers successfully, notification to the IAB-MT/UE is very easy.

However, whether such an explicit indication is really needed should be studied. For example, for the Type 2 Indication transmitted via the SIB1, the indication is no longer broadcast when the BH link is not under the RLF (i.e., "recovered") as illustrated in Option 2 in FIG. 17. Therefore, downstream IAB nodes and the UE recognize whether the BH link has been recovered based on the absence of the Type 2 Indication in the SIB1. As a matter of course, when the Type 3 Indication is transmitted via the BAP Control PDU, it has an advantage that the downstream IAB nodes can promptly know that the BH link has been recovered. However, the UE includes no BAP layer and thus disadvantageously fails to recognize the recovery. Therefore, RAN2 should study whether the Type 3 Indication is really necessary.

Proposal 3: When Proposal 2 can be agreed on, RAN2 should study whether to introduce an explicit BH RLF indication, that is, "BH link recovered" corresponding to Type 3, the indication being provided when the BH RLF is no longer present.

When Proposal 2 and/or Proposal 3 can be agreed on, the operation of the IAB-MT during recovery of the BH link should be studied, the IAB-MT having received the indication. The following was proposed: when the IAB-MT receives the Type 2 Indication, the IAB-MT reduces/stops the SR, and when the IAB-MT receives the Type 3 Indication (i.e., the BH RLF is no longer present in the parent IAB node), the IAB-MT resumes operation. This is one desirable operation of the IAB-MT when the parent node is trying to recover the BH link. It is assumed that other operations of the IAB-MT, such as operation of suspending all of the RBs, are also possible.

Proposal 4: RAN2 should agree with that the IAB-MT, who has received the Type 2 Indication and then reduced/stopped the scheduling request, resumes the scheduling request when the BH RLF is no longer present in the parent node.

Another possible operation relates to local re-routing, which has been proposed in many papers. Local re-routing is expected to be used for congestion mitigation, load balancing, etc., but may also be used for service continuity even in the case of an upstream BH RLF in the parent node or the like. For example, an IAB node can perform local re-routing upon receiving the Type 2 Indication, but in a routing configuration such as in Rel-16, the IAB node returns to the normal routing upon being notified of successful recovery from an upstream BH RLF by reception of the Type 3 Indication, or the like.

A new IAB-MT operation is available that is associated with the Rel-17 functionality, and the operation may be performed upon receipt of the Type 2 Indication. Therefore, in addition to Proposal 4, RAN2 should study other IAB-MT operations performed when the parent node is attempting to recover from the BH RLF.

Proposal 5: RAN2 should have discussions when other IAB-MT operations such as local re-routing are available that are performed while the parent node is attempting to recover the BH link.

While the BH link of the JAB node is under the RLF, it is assumed that the IAB-DU, which transmits an indication, transmits the BH RLF indication of Type 2. When an RLF occurs in the BH link, an indication is transmitted, and thus a case of the BH of single connection is easy. However, a case of the BH with duplex connectivity is more complicated. For example, upon detecting an RLF in the MCG, the IAB node initiates an MCG failure information procedure, but the SCG continues to function as a BH link, and thus the Type 2 Indication need not be transmitted at this time. When the MCG failure information procedure fails due to expiry of T316 or the like, the IAB-MT initiates RRC reestablishment, and therefore at this time, the Type 2 Indication is transmitted. Thus, the Type 2 Indication is transmitted when RRC reestablishment is initiated, not when the MCG/SCG failure information is triggered. In any case, because this concerns operation of the IAB-DU, whether to capture this in a specification/how to capture this should be carefully studied. That is, whether to add notes in stage 2 or stage 3 or nothing needs to be captured should be studied.

Proposal 6: RAN2 should agree that the BH RLF indication of Type 2 may be transmitted when the JAB-DU initiates RRC reestablishment, not when the JAB-DU initiates any of the RLF recovery procedures.

Proposal 7: RAN2 should discuss whether to capture the operation of the JAB-DU (i.e., Proposal 6) in a specification/how to capture the operation.

CHO Enhancements with Indication (Type 4)

Conditional Handover (CHO) has been introduced in Rel-16 and, to our understanding, CHO can be used as-is for Rel-16 JAB. Many companies have proposed enhancement of CHO or the use of CHO for inter-donor IAB-node migration.

In Rel-16, CHO is performed when the corresponding CHO event (A3/A5) is satisfied or when a selected cell is a CHO candidate as a result of cell selection for RRC reestablishment. These trigger conditions can be satisfied when the JAB node experiences a BH RLF on the BH link. On the other hand, the trigger conditions cannot be satisfied under an IAB-specific RLF, such as an RLF due to reception of the BH RLF indication (Type 4), because the BH link owned by the JAB node is in a good radio state. In this case, one desirable operation is to perform CHO when the JAB node receives the BH RLF indication.

Therefore, in order to improve topology adaptation of Rel-17 eIAB, it is worth studying additional trigger conditions for CHO. At least the existing BH RLF indication (i.e., Type 4) is considered to be a promising candidate as a new trigger, but if introduced, further study can be conducted on whether CHO is performed upon receipt of the Type 2 Indication.

Proposal 8: RAN2 needs to study whether any additional trigger condition is defined for the CHO, i.e., study at least the case where the IAB node receives the BH RLF indication (Type 4). If introduced, further study is needed to see if is applicable to Type 2.

Enhancements of BH RLF Recovery and Cell (Re)Selection

In an RRC reestablishment procedure, the IAB-MT first executes a cell selection procedure in order to find an appropriate cell. In the cell selection procedure, potential problems were pointed out in Rel-16, such as one that the IAB-MT may select its descendant node. Thus, this was discussed in email discussion.

As illustrated in FIG. 18, possible five solutions were discussed and summarized together with the rapporteur's view.

The conclusion was that "no further action is taken on this topic in Rel-16". This means that RAN2 agreed on "Option 4: Nothing needed since RRC reestablishment will fail if there is no BH connectivity". Option 4 requires waiting for a failure (expiry of T301) and finally going to an idle state and was thus acceptable in a Rel-16 deployment scenario even when further time is required for BH RLF recovery.

Finding 4: In Rel-16, when the IAB node attempts an RRC reestablishment request to the descendant node, the IAB node needs to wait for a failure of the attempt, and finally go to an idle state.

In Rel-17, from the viewpoint of Proposal 1, cell (re) selection and RRC reestablishment may further frequently occur. Thus, suboptimal operation, that is, operation in accordance with Finding 4, shall cause significant deterioration in performance from the viewpoint of stability of the IAB topology and service continuity. Thus, in order to optimize the operation of the IAB-MT during BH RLF recovery, "the topic can be discussed again in Rel-17", as stated by the rapporteur of the above email discussion.

Proposal 9: RAN2 should agree to study optimization of cell (re)selection in order to avoid reestablishment to an inappropriate node (for example, a descendant node).

It may be assumed that a common concept in the solutions identified except for Option 4 above is that the IAB-MT is provided with a type of either a whitelist or a blacklist for the purpose of cell selection. For example, given that topology changes may frequently occur in Rel-17 due to "inter-donor IAB-node migration", the whitelist and the blacklist have advantages and disadvantages depending on the topology and the positions of the IAB nodes.

For example, from the viewpoint of an IAB node close to an IAB donor, that is, the uppermost in DAG topology, because the number of candidate nodes is small, and in some cases only an IAB donor DU, providing the whitelist is more reasonable.

However, in another example from a viewpoint of an IAB node very distant from the IAB donor, that is, the lowermost in DAG topology, a great number of candidate nodes may need to be included in the whitelist. Instead, for example, the blacklist may be more suitable because the blacklist includes only downstream IAB nodes of the IAB node to be concerned and in some cases includes only a small number of child IAB nodes, thus reducing overhead.

One of the concerns about the whitelist is that, due to the properties of "the inter-donor IAB-node migration" in Rel-17, the list may need to include candidate IAB nodes belonging to different/adjacent IAB topologies, and may thus have an increased size. On the other hand, downstream IAB nodes of course belong to the same IAB topology, and thus there are no such concerns about the blacklist.

Finding 5: The whitelist and the blacklist have advantages and disadvantages depending on the topology and the positions of the IAB nodes.

Thus, when information is provided to the child IAB node for the purpose of cell selection, the IAB donor (or the parent IAB node) may be desirably able to select the use of either the whitelist or the blacklist. Note that study should be also conducted on whether the reuse of this information for the purpose of cell reselection is beneficial.

Proposal 10: RAN2 should agree to provide the whitelist or the blacklist (i.e., selection structure) to the IAB-MT for the purpose of cell selection in order to avoid reestablishment to a descendant node. Whether these lists can also be used for a cell reselection procedure requires further study.

If Proposal 10 can be agreed on, how to provide the information (that is, the whitelist or the blacklist) should be further studied. Option 1 assumes CHO configuration, and some enhancements may be required. Option 2 assumes additional indications, for example, the BH RLF indication of Type 2. Option 3 assumes provision of information of the overall topology, which is not present in the existing configuration. Option 5 assumes OAM-based configuration; however, this is questionable as the rapporteur pointed out.

Considering again the assumption of Rel-17 (i.e., Proposal 1), that is, the need for the parent IAB node or the IAB donor to provide the list to the child IAB node in response to a topology change, the whitelist/blacklist needs to be dynamically provided. Thus, Option 5, that is, OAM, should be excluded. Which method, that is, which method out of Options 1, 2, and 3, is to be used as the baseline for the enhancements requires further study.

Proposal 11: RAN2 should agree that the parent IAB node or the IAB donor dynamically provides the whitelist/blacklist each time the topology is changed. The details thereof require further study.

Enhancements of Lossless Delivery

In the stage of research of Rel-15, the problem of multi-hop RLC ARQ was discussed and captured in Section 8.2.3 of TR. In Rel-16, the protocol stack was defined for the IAB including unsplit RLC layers. In other words, in Rel-16, end-to-end ARQ was excluded, and hop-by-hop ARQ was adopted.

Regarding the hop-by-hop ARQ, the problem in end-to-end reliability, that is, lossless delivery with UL packets, was identified. As illustrated in FIG. 19, three solutions were identified and evaluated.

In Rel-16, "Modification of PDCP protocol/procedures" being a first solution was not adopted because it would affect a Rel-15 UE.

"Rerouting of PDCP PDUs buffered on intermediate IAB-nodes" corresponding to a second solution was supported as an implementation selection in the BAP layer. The BAP layer may implement the second solution on the assumption that "data buffering in a transmission part of a BAP entity until an RLC-AM entity receives an acknowledgment response is implementation dependent, for example". These BAP implementations were considered in order to avoid packet loss in "most" of the cases of the Rel-16 deployment scenario, that is, the cases where stationary IAB nodes are used. However, the implementations were not perfect as illustrated in FIG. 19, for example.

"Introducing UL status delivery" corresponding to a third solution was a promising solution for guaranteeing lossless delivery of UL data, with evaluation results cited in FIG. 19 taken into consideration. The idea was to delay the RLC ARQ to the UE, so that PDCP data recovery at the UE is initiated when necessary. However, this was not defined in Rel-16 because it had been assumed that UL packets would be rarely dropped due to topology change as the stationary IAB node was assumed.

Considering the assumption of Rel-17, that is, from the viewpoint of Proposal 1, it is no longer rare that UL packets are lost during the topology change, which occurs frequently in Rel-17, and thus the third solution should be further studied. Thus, RAN2 should discuss an enhancement mechanism for guaranteeing lossless delivery in an L2 multi-hop network, in addition to the results captured in TR.

Proposal 12: RAN2 should agree to introduce a solution identified in TR 38.874, that is, a mechanism to guarantee lossless delivery under a condition that the topology change possibly frequently occur based on some form of "UL status delivery".

For the details of the third solution, that is, "Introducing UL status delivery", two options, namely C-1 and C-2, were discussed via email as illustrated in FIG. 20.

Regarding C-1 above, it is assumed that a "confirmation" from the IAB donor needs to be defined in the BAP or the RRC for end-to-end signaling forwarding via the multi-hop L2 network. Thus, in order to define the option, a relatively high standard effort shall be required.

Regarding C-2 above, when C-2 fully functions in the IAB topology and the RLC ACK is to be transmitted to the UE (or the downstream IAB node) even if it needs to be assumed that OAM configures all of the IAB nodes with the use of the option, it finally depends on IAB-DU implementation, and thus C-2 can be actually implemented for a Rel-16 IAB node as well. Because hop-by-hop feedback is assumed and no additional Control PDUs are assumed, C-2 is easier to implement than C-1. Thus, C-2 should be the baseline for the enhancements of Rel-17 for lossless delivery of the UL packets.

Finding 6: C-2 being a solution of "Introducing UL status delivery" may be the baseline for the enhancements of Rel-17, and this can be implemented for Rel-16 as well.

Note that, because Rel-17 should assume dynamic topology change that causes UL packet loss, the enhancements of Rel-17 shall support C-2 as a standard support function. At least in the specification of stage 2, an overall mechanism based on C-2 should be described. Otherwise, in the 3GPP standard, lossless delivery is not guaranteed during the handover of the IAB node. In stage 3, although minor changes such as those of the RLC and/or the BAP are expected, these are regarded as internal operations of the IAB node, and thus details thereof may not be defined.

Proposal 13: RAN2 should agree to define an RLC ARQ mechanism for lossless delivery of UL packets in stage 2. This delays transmission of the ACK to the child node/UE before the ACK is received from the parent IAB node (i.e., C-2). Whether to define this in stage 3/how to define this require further study.

Inter-Donor IAB-Node Migration

The IAB node integration procedure is introduced into Rel-16 and is used for the initial integration of IAB nodes. In other words, the IAB node integration procedure is still in the service suspension phase.

Rel-17 is intended to specify the inter-donor IAB-node migration, which provides robust operation and is to be applied to mobile IAB nodes. Unlike in Rel-16, the inter-donor IAB-node migration in Rel-17 is performed in a working phase, and thus the inter-donor IAB-node migration of one IAB node affects the entire topology and causes service interruption. In other words, for the Rel-17 inter-donor IAB-node migration, study needs to be conducted about how each of all IAB nodes in the IAB topology migrates to another IAB donor, specifically how RRC reconfiguration with synchronization (i.e., handover command) is provided to the affected IAB nodes.

Figure 21:
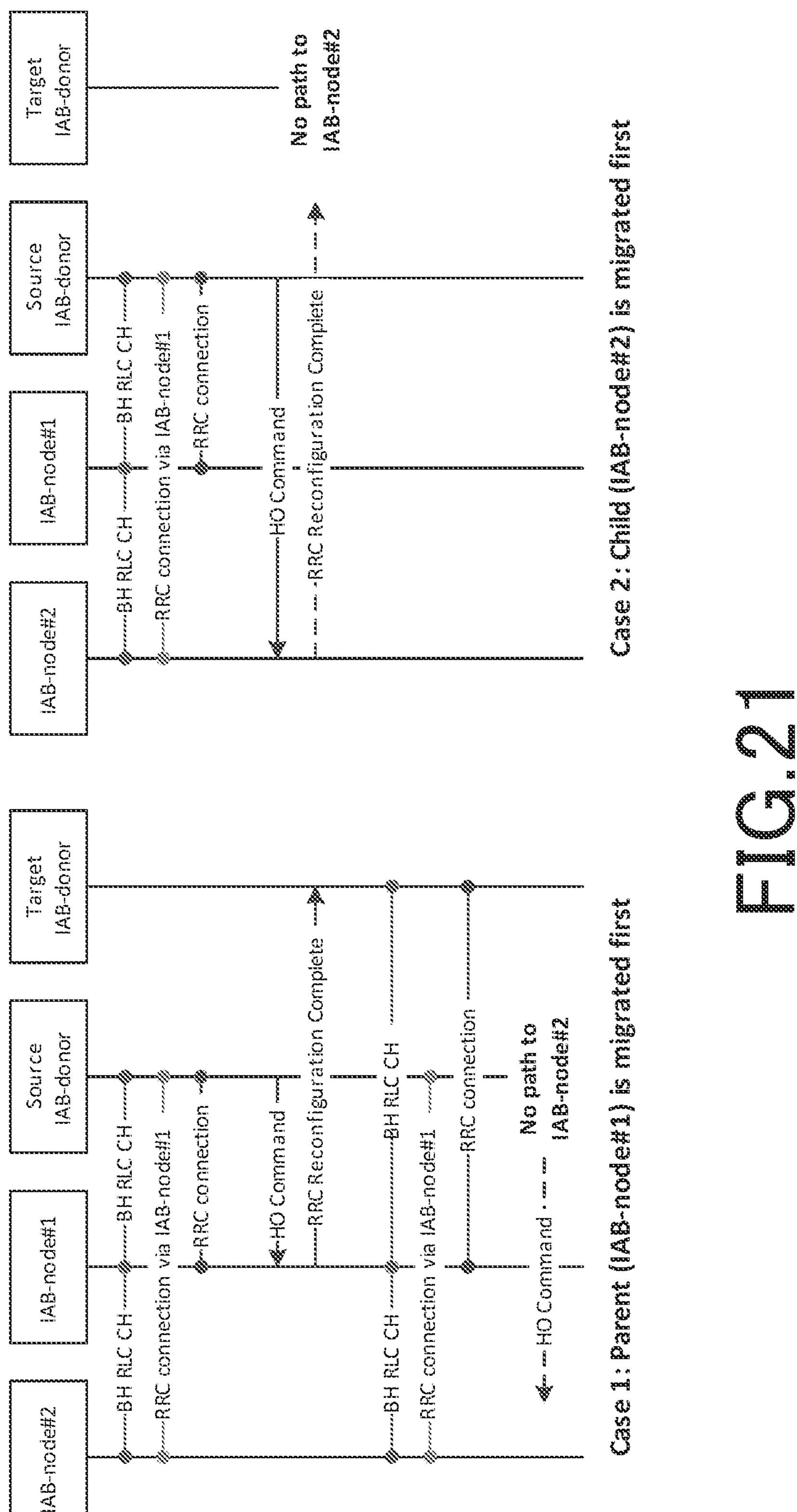
FIG. 21 illustrates a potential problem of RAN2 signaling during inter-donor IAB-node migration.

As illustrated in FIG. 21, assuming that a child node (IAB node #2) is connected to a source IAB donor via a parent node (IAB node #1), a set of signaling problems may occur.

Case 1: When the parent is first migrated, the RRC signaling path between the child and the source donor is released. Therefore, how the child node can be migrated is unknown. Case 2: When the child is first migrated, the RRC signaling path to the target donor via the parent node has yet to be established. Accordingly, how the child node accesses the target donor (i.e., how to complete and transmit the RRC reconfiguration to the target donor) is unknown.

For Case 1, study is conducted about the reuse of CHO using some enhancements of the child node, that is, when the parent node is migrated, the child node executes CHO. For Case 2, the child is considered to wait to send an RRC reconfiguration to the target donor, e.g., until the parent node is migrated.

In either case, an option may be that the child node is first released and that re-integration is then performed by using the Rel-16 procedure. This; however, may not be expected to be a solution in Rel-17, considering critical service interruption.

Although RAN3 has been discussing the general procedure of the inter-donor IAB-node migration, RAN2 needs to study the impact of RAN2 on how to reconfigure a plurality of IAB nodes in a multi-hop network.

Proposal 14: RAN2 needs to study how to reconfigure multi-hop IAB nodes for the inter-donor IAB-node migration.

The invention claimed is:

1. A communication control method used in a cellular communication system, the communication control method comprising:

receiving a routing configuration provided from a donor node;

receiving, by a second relay node and from a first relay node, a failure occurrence notification indicating occurrence of a failure in a backhaul link, the backhaul link being a radio link between the first relay node and a parent node of the first relay node, the second relay node being a child node of the first relay node; and by the second relay node and in response to reception of the failure occurrence notification, considering a main path as not available and performing routing for upstream traffic to an alternative path for the main path based on the routing configuration provided from the donor node, wherein the routing configuration includes an identity of the main path, a BAP (Backhaul Adaptation Protocol) address of each node on the main path, an identity of the alternative path, and a BAP address of each node on the alternative path.

2. The communication control method according to claim 1, further comprising:

receiving, by the second relay node and from the first relay node, a recovery notification indicating recovery from the failure; and by the second relay node and in response to reception of the recovery notification, considering the main path to be available again and performing routing for upstream traffic to the main path.

3. A second relay node comprising:

a receiver configured to receive a routing configuration provided from a donor node, the receiver configured to receive from a first relay node, a failure occurrence notification indicating occurrence of a failure in a backhaul link, the backhaul link being a radio link between the first relay node and a parent node of the first relay node, the second relay node being a child node of the first relay node; and a controller configured to in response to reception of the failure occurrence notification, consider a main path as not available and perform routing for upstream traffic to an alternative path for the main path based on the routing configuration provided from the donor node, wherein the routing configuration includes an identity of the main path, a BAP (Backhaul Adaptation Protocol) address of each node on the main path, an identity of the alternative path, and a BAP address of each node on the alternative path.

4. An apparatus configured to control a second relay node, the apparatus comprising a processor and a memory coupled to the processor, the processor configured to:

receive a routing configuration provided from a donor node;

receive from a first relay node, a failure occurrence notification indicating occurrence of a failure in a backhaul link, the backhaul link being a radio link between the first relay node and a parent node of the first relay node, the second relay node being a child node of the first relay node; and in response to reception of the failure occurrence notification, consider a main path as not available and perform routing for upstream traffic to an alternative path for the main path based on the routing configuration provided from the donor node, wherein the routing configuration includes an identity of the main path, a BAP (Backhaul Adaptation Protocol) address of each node on the main path, an identity of the alternative path, and a BAP address of each node on the alternative path.

* * * * *